United States Patent
Torrey et al.

(10) Patent No.: US 7,079,530 B1
(45) Date of Patent: Jul. 18, 2006

(54) SYSTEM AND METHOD FOR CACHING TOLL FREE NUMBER INFORMATION

(75) Inventors: Jason P. Torrey, Boulder, CO (US); Gregory Dean Johnson, Shawnee, KS (US)

(73) Assignee: Sprint Communications Company L.P., Overland Park, KS (US)

(*) Notice: Subject to any disclaimer, the term of this patent is extended or adjusted under 35 U.S.C. 154(b) by 788 days.

(21) Appl. No.: 09/794,647

(22) Filed: Feb. 27, 2001

Related U.S. Application Data

(63) Continuation-in-part of application No. 09/257,320, filed on Feb. 25, 1999, now Pat. No. 6,560,226.

(51) Int. Cl.
*H04M 7/00* (2006.01)

(52) U.S. Cl. ................................. 370/360; 370/428

(58) Field of Classification Search ........... 370/357, 370/360, 428, 429; 379/219, 220.01, 221.01, 379/221.13, 221.14
See application file for complete search history.

(56) References Cited

U.S. PATENT DOCUMENTS

| | | |
|---|---|---|
| 4,310,727 A | 1/1982 | Lawser |
| 4,348,554 A | 9/1982 | Asmuth |
| 4,720,850 A | 1/1988 | Oberlander |
| 4,748,658 A | 5/1988 | Gopal et al. |
| 4,763,317 A | 8/1988 | Lehman |
| 4,924,510 A * | 5/1990 | Le ........................ 379/221.09 |
| 5,018,191 A | 5/1991 | Catron et al. |
| 5,089,954 A | 2/1992 | Rago |
| 5,115,427 A | 5/1992 | Johnson, Jr. et al. |
| 5,163,087 A | 11/1992 | Kaplan |
| 5,182,550 A | 1/1993 | Masuda et al. |
| 5,218,602 A | 6/1993 | Grant et al. |
| 5,239,539 A | 8/1993 | Uchida et al. |
| 5,251,255 A | 10/1993 | Epley |
| 5,282,244 A | 1/1994 | Fuller et al. |
| 5,289,536 A | 2/1994 | Hokari |
| 5,291,479 A | 3/1994 | Vaziri et al. |
| 5,291,492 A | 3/1994 | Andrews et al. |
| 5,367,566 A | 11/1994 | Moe et al. |
| 5,377,186 A | 12/1994 | Wegner et al. |
| 5,384,771 A | 1/1995 | Isidoro et al. |
| 5,384,840 A | 1/1995 | Blatchford et al. |
| 5,392,402 A | 2/1995 | Robrock, II |
| 5,420,916 A | 5/1995 | Sekiguchi |
| 5,425,090 A | 6/1995 | Orriss |
| 5,434,852 A | 7/1995 | La Porta et al. |
| 5,459,721 A | 10/1995 | Yoshida |
| 5,461,669 A | 10/1995 | Vilain |

(Continued)

OTHER PUBLICATIONS

Homa, J., et al., "Intelligent Network Requirements For Personal Communications Services," pp. 70-76, IEEE Communications Magazine, Feb. 1992.

(Continued)

*Primary Examiner*—Derrick Ferris

(57) ABSTRACT

A system and method for caching N00 information comprises an N00 cache that can be located in a signaling processor. The N00 cache is a memory cache that contains the N00 information, such as the N00 number and a destination number. The signaling processor receives and processes call signaling. The signaling processor accesses the N00 cache to determine if the destination number for the N00 number exists. The N00 cache returns the destination number if a match is found for the N00 number. If a match is not found, the signaling processor can be configured to query an N00 service control point (SCP).

6 Claims, 19 Drawing Sheets

U.S. PATENT DOCUMENTS

| | | | |
|---|---|---|---|
| 5,469,501 | A | 11/1995 | Otsuka |
| 5,473,677 | A | 12/1995 | D'Amato et al. |
| 5,479,495 | A | 12/1995 | Blumhardt |
| 5,490,251 | A | 2/1996 | Clark et al. |
| 5,499,290 | A | 3/1996 | Koster |
| 5,509,010 | A | 4/1996 | LaPorta et al. |
| 5,509,123 | A | 4/1996 | Dobbins et al. |
| 5,513,180 | A | 4/1996 | Miyake et al. |
| 5,513,355 | A | 4/1996 | Doellinger et al. |
| 5,526,359 | A | 6/1996 | Read et al. |
| 5,541,917 | A | 7/1996 | Farris |
| 5,550,914 | A | 8/1996 | Clarke et al. |
| 5,572,583 | A | 11/1996 | Wheeler, Jr. et al. |
| 5,583,849 | A | 12/1996 | Ziemann et al. |
| 5,586,177 | A | 12/1996 | Farris et al. |
| 5,600,640 | A | 2/1997 | Blair et al. |
| 5,600,643 | A | 2/1997 | Robrock, II |
| 5,640,446 | A | 6/1997 | Everett et al. |
| 5,703,876 | A | 12/1997 | Christie |
| 5,708,702 | A | 1/1998 | De Paul et al. |
| 5,745,553 | A | 4/1998 | Mirville |
| 5,765,108 | A | 6/1998 | Martin et al. |
| 5,784,371 | A | 7/1998 | Iwai |
| 5,796,813 | A | 8/1998 | Sonnenberg |
| 5,825,780 | A | 10/1998 | Christie |
| 5,835,584 | A | 11/1998 | Penttonen |
| 5,854,836 | A | 12/1998 | Nimmagadda |
| 5,867,562 | A | 2/1999 | Scherer |
| 5,867,570 | A | 2/1999 | Bargout et al. |
| 5,889,782 | A | 3/1999 | Dendi |
| 5,889,848 | A | 3/1999 | Cookson |
| 5,920,562 | A | 7/1999 | Christie et al. |
| 5,926,482 | A | 7/1999 | Christie |
| 5,940,487 | A | 8/1999 | Bunch et al. |
| 5,940,491 | A | 8/1999 | Anderson et al. |
| 5,991,301 | A | 11/1999 | Christie |
| 6,002,689 | A | 12/1999 | Christie et al. |
| 6,016,343 | A | 1/2000 | Hogan et al. |
| 6,031,840 | A | 2/2000 | Christie |
| 6,097,801 | A | 8/2000 | Williams et al. |
| 6,098,094 | A | 8/2000 | Barnhouse et al. |
| 6,137,800 | A | 10/2000 | Wiley et al. |
| 6,181,703 | B1 | 1/2001 | Christie et al. |
| 6,298,043 | B1 | 10/2001 | Mauger et al. |
| 6,324,179 | B1 | 11/2001 | Doshi et al. |
| 2002/0067817 | A1* | 6/2002 | Canihuanta et al. ........ 379/219 |

OTHER PUBLICATIONS

Weisser, F. J., et al., The Intelligent Network And Forward-Looking Technology, IEEE Communications Magazine, vol. 26, No. 12, Dec. 1988, New York (US), pp. 64-69, Dec., 1988.

Batten, A., "Personal Communications Services And The Intelligent Network," British Telecommunications Engineering, vol. 9, Aug. 1990.

Fukazawa, M., et al., "Intelligent Network Call Model For Broadband ISDN," pp. 30.6.1-30.6.5, Fujitsu Laboratories Ltd., Japan.

Jordan, Bell Operating Company Intelligent Voice Networks And Services, Bell Communications Research, (New Jersey) pp. 100-113.

Russo, E.G., et al., "Intelligent Network Platforms In The U.S.," pp. 26-43, AT&T Technical Journal, 1991.

Helen A. Bauer, John J. Kulzer, Edward G. Sable, "Designing Service-Independent Capabilities for Intelligent Networks," IEEE, Dec. 1988, pp. 31-41.

ITU-T Q.1219, "Intelligent Network User's Guide For Capability Set 1," Apr., 1994.

Thorner, "Intelligent Networks, Chapter 2," 1994, Artech House, pp. 11-107.

ITU-T, Recommendation Q.722, "Specification of Signalling System No. 7, General Function of Telephone Messages and Signals," 1993.

Hoffpauir et al., "Application Provider and Method for Communication," Reg. Number: H1,895; Published: Oct. 3, 2000.

Hoffpauir et al., "Network Management System Server and Method for Operation," Reg. Number: H1,896; Published: Oct. 3, 2000.

Fletcher et al., "Merged Operations and Maintenance Center and Method for Operation," Reg. Number: H1,897; Published: Oct. 3, 2000.

* cited by examiner

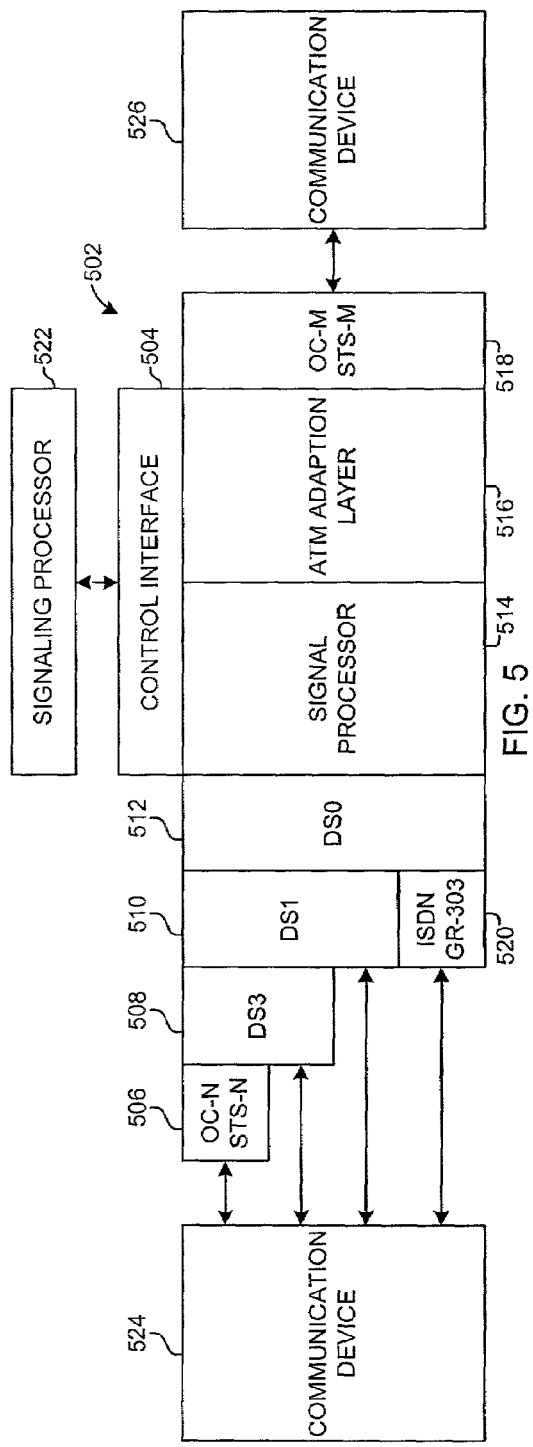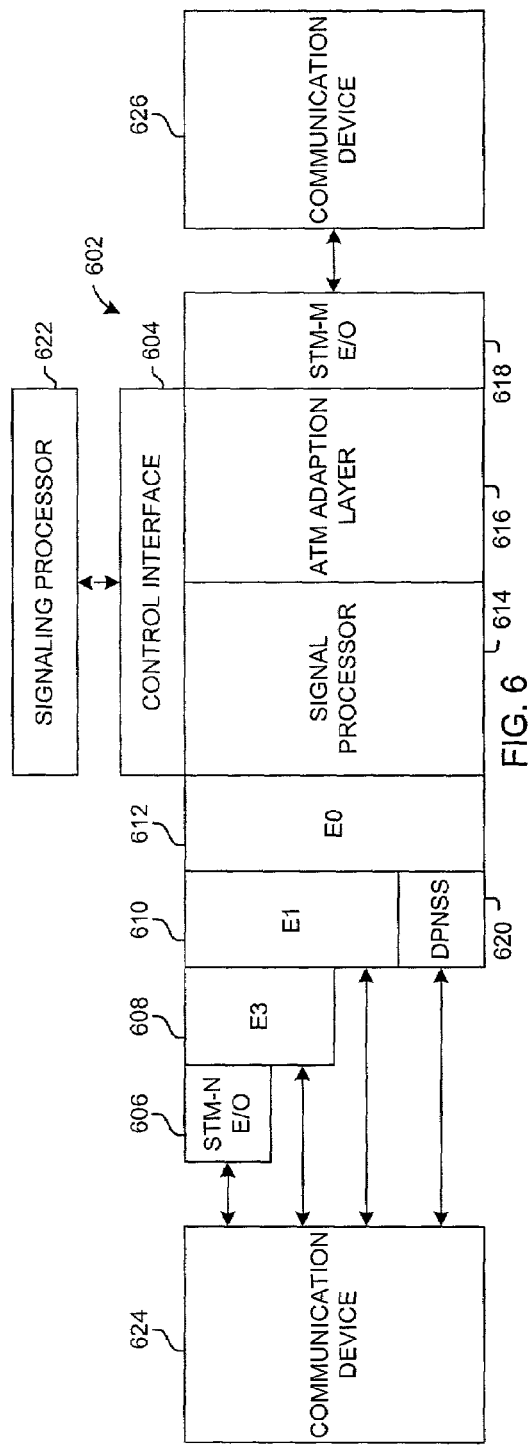

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
|  |  |  |  |  |  |  |  |  |
|  |  |  |  |  |  |  |  |  |

FIG. 12

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
|  |  |  |  |  |  |  |  |
|  |  |  |  |  |  |  |  |

FIG. 13

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
|  |  |  |  |  |  |  |  |  |
|  |  |  |  |  |  |  |  |  |

FIG. 14A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
|  |  |  |  |  |  |  |  |  |
|  |  |  |  |  |  |  |  |  |

FIG. 14B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
|  |  |  |  |  |  |  |  |
|  |  |  |  |  |  |  |  |

FIG. 14C

| CARRIER LABEL | CARRIER ID | CARRIER SELECTION | NEXT FUNCTION | NEXT LABEL |
|---|---|---|---|---|
| | | | | |
| | | | | |

FIG. 15

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |
| | | | | | | |

FIG. 16

| OLI LABEL | ORIGINATION LINE INFORMATION | NEXT FUNCTION | NEXT LABEL |
|---|---|---|---|
| | | | |
| | | | |

FIG. 17

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |
| | | | | | | | | | |

FIG. 18

| CALLED NUMBER SCREENING LABEL | CALLED NUMBER | | DELETE DIGITS | DIGITS TO | NEXT FUNCTION | NEXT LABEL |
|---|---|---|---|---|---|---|
| | NATURE OF ADDRESS | DIGITS FROM | | | | |
| | | | | | | |
| | | | | | | |

FIG. 19

| CALLED NUMBER | | | NEXT | |
|---|---|---|---|---|
| CALLED NUMBER LABEL | NATURE OF ADDRESS | DIGITS FROM | DIGITS TO | NEXT FUNCTION | NEXT LABEL |
| | | | | | |
| | | | | | |

FIG. 20

| DAY OF YEAR LABEL | DATE | NEXT FUNCTION | NEXT LABEL |
|---|---|---|---|
| | | | |
| | | | |

FIG. 21

| DAY OF WEEK | DAY FROM | DAY TO | NEXT FUNCTION | NEXT LABEL |
|---|---|---|---|---|
| | | | | |
| | | | | |

FIG. 22

| TIME OF DAY LABEL | TIME FROM | TIME TO | NEXT FUNCTION | NEXT LABEL |
|---|---|---|---|---|
| | | | | |
| | | | | |

FIG. 23

| TIME ZONE LABEL | UTC OFFSET | DAYLIGHT SAVINGS |
|---|---|---|
| | | |
| | | |

FIG. 24

| ROUTING LABEL | ROUTE NUMBER | NEXT FUNCTION | NEXT LABEL | SIGNAL ROUTE LABEL |
|---|---|---|---|---|
| | | | | |

FIG. 25

| ORIGINATING TRUNK COS LABEL | TERMINATING TRUNK COS LABEL | NEXT FUNCTION | NEXT LABEL |
|---|---|---|---|
| | | | |

FIG. 26

| TREATMENT LABEL | ERROR/CAUSE LABEL | NEXT FUNCTION | NEXT LABEL |
|---|---|---|---|
| | | | |

FIG. 27

| OUTGOING RELEASE LABEL | LOCATION | OUTGOING CAUSE VALUE | |
|---|---|---|---|
| | | CODING STANDARD | CAUSE VALUE |
| | | | |

FIG. 28

| PERCENT LABEL | CONTROL | | | |
|---|---|---|---|---|
| | CONTROL PERCENTAGE | NEXT FUNCTION | NEXT LABEL | PASSED |
| | | | | NEXT FUNCTION | NEXT LABEL |
| | | | | | |

FIG. 29

| CALL RATE LABEL | CALL RATE | CONTROL | | PASSED | |
|---|---|---|---|---|---|
| | | NEXT FUNCTION | NEXT LABEL | NEXT FUNCTION | NEXT LABEL |
| | | | | | |

FIG. 30

| DATABASE SERVICES LABEL | SERVICE TYPE | SCCP LABEL | TCAP LABEL | NEXT FUNCTION | NEXT LABEL |
|---|---|---|---|---|---|
| | | | | | |

FIG. 31

| SCCP LABEL | MESSAGE TYPE | PROTOCOL CLASS | MESSAGE HANDLING | HOP COUNTER | SEGMENTATION |
|---|---|---|---|---|---|
| | | | | | |

FIG. 32A

| ISNI TYPE | ISNI | | LABEL |
|---|---|---|---|
| | ROUTE INDICATOR | MARK INDICATOR | |
| | | | |

FIG. 32B

| CALLED PARTY ADDRESS | | | | | | | GLOBAL TITLE | | | |
|---|---|---|---|---|---|---|---|---|---|---|
| | ADDRESS INDICATOR | | | | SUB SYSTEM NUMBER | POINT CODE NUMBER | | | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |

FIG. 32C

| CALLING PARTY ADDRESS | | | | | | | | |
|---|---|---|---|---|---|---|---|---|
| | ADDRESS INDICATOR | | | | | GLOBAL TITLE | | |
| SSN | POINT CODE | GLOBAL TITLE INDICATOR | ROUTING INDICATOR | NATIONAL/ INTERNATIONAL | SUB SYSTEM NUMBER | POINT CODE NUMBER | TRANSLATION TYPE | ENCODE SCHEME | NUMBER PLAN | ADDRESS TYPE |
| | | | | | | | | | | |

FIG. 32D

| ISNI LABEL | NETWORK 1 | NETWORK 2 | NETWORK 3 | NETWORK ... | NETWORK 16 |
|---|---|---|---|---|---|
| | | | | | |

FIG. 33

| TCAP LABEL | TCAP TYPE | TAG CLASS | PACKAGE TYPE | COMPONENT TYPE | MESSAGE TYPE |
|---|---|---|---|---|---|
| | | | | | |

FIG. 34

| ECHO CANCELLER LABEL | ECHO CANCELLER TYPE | RS-232 ADDRESS | MODULE |
|---|---|---|---|
| | | | |

FIG. 35

| IWU LABEL | IWU ID | IP SOCKET 1 | IP SOCKET 2 | IP SOCKET 3 | IP SOCKET 4 |
|---|---|---|---|---|---|
| | | | | | |

FIG. 36

| CAM INTERFACE LABEL | CAM LABEL | LOGICAL INTERFACE |
|---|---|---|
| | | |

FIG. 37

| CAM LABEL | CAM TYPE | CAM ADDRESS |
|---|---|---|
|  |  |  |

FIG. 38

| OFFICE CLLI NAME | SITE NODE ID | ORIGINATION ID | SOFTWARE ID | CALL PROCESSOR ID |
|---|---|---|---|---|
|  |  |  |  |  |

FIG. 39A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
|  |  |  |  |  |  |  |

FIG. 39B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
|  |  |  |  |  |  |  |

FIG. 39C

| MAX HOP COUNTS | MAX TABLE LOOKUPS |
|---|---|
|  |  |

FIG. 39D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

FIG. 40A

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

FIG. 40B

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

FIG. 41

SYSTEM AND METHOD FOR CACHING TOLL FREE NUMBER INFORMATION

RELATED APPLICATIONS

This application is a continuation-in-part of prior application Ser. No. 09/257,320, entitled "SYSTEM AND METHOD FOR CACHING PORTED NUMBER INFORMATION" filed Feb. 25, 1999, now U.S. Pat. No. 6,560,226, currently pending and incorporated by reference into this application.

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport and, more particularly, for processing calls for N00 numbers.

BACKGROUND OF THE INVENTION

Broadband systems provide telecommunications providers with many benefits, including greater bandwidth, more efficient use of bandwidth, and the ability to integrate voice, data, and video communications. These broadband systems provide callers with increased capabilities at lower costs.

The broadband systems now are implementing systems and methods for connecting calls to ported numbers. Local number portability (LNP) allows a user to retain its dialed number (DN) when the user changes physical locations, such as moving from one location associated with a first signaling processor to another location associated with a second signaling processor, when a user changes services, or when a user changes service providers.

Many switches and other call processors are configured to identify calls that are assigned to portable switches or other call processors. As used herein, the terms "portable switch or other call processor", "portable call processor", "portable switch", or "portable signaling processor" mean a switch or other call processor, a call processor, a switch, or a signaling processor that is open to have a ported dialed number assigned to that switch or other call processor, call processor, switch, or signaling processor, respectively. A portable switch, a portable call processor, or a portable signaling processor may serve one or more number plan area and central office code combinations (NPA-NXXs), and at least one NPA-NXX is open to have a ported dialed number associated with that NPA-NXX.

The call signaling associated with a call has an NPA-NXX. The called party is assigned to a phone number having an NPA-NXX as the first six digits of a ten digit phone number. This NPA-NXX can identify a signaling processor that is associated with the called party and can be assigned to a portable signaling processor.

Typically, when a signaling processor receives call signaling for a call having an NPA-NXX that may be assigned to a portable signaling processor, the signaling processor must query a local number portability service control point (LNP SCP) to determine whether the DN is, in fact, ported. The LNP SCP returns a response containing a location routing number (LRN) for the call if the dialed number is ported. If the dialed number is not ported, the LNP SCP returns a response with the dialed number digits of the called party.

It is time consuming to make a query to the LNP SCP for each dialed number that may be ported. Each call is allocated a specified period of time for processing of the call signaling for determination of a route for the call, and a query to the LNP SCP consumes part of that time. Ultimately, a congested situation can occur in a signaling processor if too many queries are made to the LNP SCP.

Thus, an improved system is needed that will provide LNP information for a signaling processor without always making queries to the LNP SCP. The present system provides the needs associated with improved call processing time and reduced queries to an LNP SCP.

SUMMARY OF THE INVENTION

The present invention is directed to a system for processing call signaling. The system comprises a signaling processor that receives the call signaling, processes the call signaling, and determines if a search criteria for a search matches an LNP information element. The signaling processor selects the search criteria for the search. The system further comprises an LNP cache having LNP information. The LNP cache is adapted to be searched using the search criteria to determine if the LNP information element exists in the LNP information. The search has a result.

The present invention is also directed to a system for processing call signaling. The system comprises an LNP cache that has LNP information. The system has a signaling processor to receive the call signaling, to query the LNP information in the LNP cache using an index to determine if the index matches an LNP information element, and to process the call signaling and a result of the query.

The present invention further is directed to a system for processing signaling. The system comprises an LNP cache having LNP information. The LNP cache can search the LNP information to determine if an LNP information element matches a search criteria and to have a result. The system has a signaling processor that receives the signaling and designates the search criteria used in the LNP cache.

Further still, the present invention is directed to a system for processing signaling. The system comprises an LNP cache having LNP information. The LNP cache can be accessed to determine if a search criteria matches an LNP information element in the LNP information. A result of the access comprises an LNP parameter. The system includes a signaling processor that receives the signaling, designates the search criteria, and processes the signaling and the LNP parameter from the result.

Further yet, the present invention is directed to a system for connecting a call having call signaling. The system comprises a signaling processor to receive the call signaling, to designate a search criteria for a search to determine if an LNP information element matches the search criteria, and to process the call signaling and a result of the search to select a processing option for the call. The system further comprises an LNP cache having LNP information. The LNP cache can be searched using the search criteria to determine if the LNP information element exists in the LNP information. The search has the result.

Further, the present invention is directed to a system for connecting a call having call signaling. The system comprises an LNP cache having LNP information. The system also comprises a signaling processor that receives the call signaling, accesses the LNP information in the LNP cache to determine if a designated dialed number exists therein and, if existent, if the dialed number has an associated location routing number. The signaling processor processes the call signaling with a result of the access to select a connection for the call.

In addition, the present invention is directed to a method for processing signaling. The method comprises receiving the signaling in the signaling processor and designating a search criteria by the signaling processor. The method includes searching LNP information in an LNP cache to determine if the search criteria matches an LNP information element, the searching having a result.

Also, the present invention is directed to a method for connecting a call having call signaling. The method comprises co-locating an LNP cache having LNP information with a signaling processor. The method includes receiving the call signaling in the signaling processor and designating a search criteria from the signaling processor. Further included in the method is searching the LNP information to determine if the search criteria matches an LNP information element. Also included is processing a result of the searching and the call signaling to select a processing option for the call.

The present invention comprises a system for connecting a call having call signaling and user communications. The system comprises a signaling processor that is adapted to receive the call signaling, to process the call signaling to determine a search is required to determine if a search criteria matches an LNP information element, and to select the search criteria for the search. An LNP cache has LNP information. The LNP cache is adapted to be searched using the search criteria to determine if the LNP information element exists in the LNP information, the search having a result. A communication device is adapted to receive, to handle, and/or to transmit the call signaling or new call signaling.

The present invention further comprises a system for connecting a call having call signaling and user communications. The system comprises an LNP cache that has LNP information. A signaling processor is adapted to receive the call signaling, to query the LNP information in the LNP cache using an index to determine if the index matches an LNP information element, and to process the call signaling and a result of the query. A communication device is adapted to receive, to handle, and/or to transmit the call signaling or new call signaling.

The present invention further comprises a system for connecting a call having call signaling and user communications. The system comprises an LNP cache that has LNP information. The LNP cache is adapted to search the LNP information to determine if an LNP information element matches a search criteria and to have a result. A signaling processor is adapted to receive the signaling and to designate the search criteria used in the LNP cache. A communication device is adapted to receive, to handle, and/or to transmit the call signaling or new call signaling.

The present invention further comprises a system for connecting a call having call signaling and user communications. The system comprises an LNP cache having LNP information. The LNP cache is adapted to be accessed to determine if a search criteria matches an LNP information element in the LNP information. A result of the access comprises an LNP parameter. A signaling processor is adapted to receive the signaling, to designate the search criteria, and to process the signaling and the LNP parameter from the result. A communication device is adapted to receive, to handle, and/or to transmit the call signaling or new call signaling.

The present invention also comprises a system for connecting a call having call signaling and user communications. The system comprises a signaling processor adapted to receive the call signaling, to designate a search criteria for a search to determine if an LNP information element matches the search criteria, and to process the call signaling and a result of the search to select a processing option for the call. An LNP cache has LNP information. The LNP cache is adapted to be searched using the search criteria to determine if the LNP information element exists in the LNP information, the search having the result. A communication device is adapted to receive, to handle, and/or to transmit the call signaling or new call signaling.

Further, the present invention comprises a system for connecting a call having call signaling and user communications. The system comprises an LNP cache having LNP information. A signaling processor is adapted to receive the call signaling, to access the LNP information in the LNP cache to determine if a designated dialed number exists therein and, if existent, if the dialed number has an associated location routing number, and to process the call signaling with a result of the access to select a connection for the call. A communication device adapted to receive, to handle, and/or to transmit the call signaling or new call signaling.

Further still, the present invention comprises a method for connecting a call having call signaling and user communications. The method comprises receiving the signaling in the signaling processor and designating a search criteria by the signaling processor. The method includes searching LNP information in an LNP cache to determine if the search criteria matches an LNP information element, the searching having a result. The method also includes receiving, handling, and/or transmitting the call signaling or new call signaling at a communication device.

Further still, the present invention comprises a method for connecting a call having call signaling and user communications. The method comprises co-locating an LNP cache having LNP information with a signaling processor. The method further comprises receiving the call signaling in the signaling processor and designating a search criteria from the signaling processor. The method includes searching the LNP information to determine if the search criteria matches an LNP information element and processing a result of the searching and the call signaling to select a processing option for the call. The method also includes receiving, handling, and/or transmitting the call signaling or new call signaling at a communication device.

Moreover, the present invention is directed to a system for connecting a call having call signaling and user communications. The system comprises a signaling processor that is adapted to receive the call signaling and to process the call signaling to determine a search is required to determine if a search criteria matches an LNP information element. The signaling processor selects the search criteria for the search, selects a connection for the user communications, and transmits a control message identifying the selected connection. An LNP cache has LNP information and is adapted to be searched using the search criteria to determine if the LNP information element exists in the LNP information. The search has a result. A connection system is adapted to receive the user communications and the control message and, in response to the control message, to connect the user communications over the designated connection.

In addition, the present invention is directed to a system for connecting a call having call signaling and user communications. The system comprises an LNP cache having LNP information. A signaling processor is adapted to receive the call signaling, to query the LNP information in the LNP cache using an index to determine if the index matches an LNP information element, and to process the call signaling and a result of the query. The signaling processor selects a connection for the user communications and transmits a control message identifying the select connection. A connection system is adapted to receive the user communications and the control message and, in response to the control message, to connect the user communications on the selected connection.

Also, the present invention is directed to a system for connecting a call having call signaling and user communications. The system comprises an IMP cache having LNP information and adapted to search the LNP information to determine if an LNP information element matches a search criteria and to have a result. A signaling processor is adapted to receive the signaling and to designate the search criteria used in the LNP cache. The signaling processor processes the result with the call signaling, select a connection for the user communications, and transmits a control message identifying the selected connection. A connection system is adapted to receive the user communications and the control message and, in response to the control message, to connect the user communications over the selected connection.

Further, the present invention is directed to a system for connecting a call having call signaling and user communications. The system comprises an LNP cache having LNP information and adapted to be accessed to determine if a search criteria matches an LNP information element in the LNP information. A result of the access comprises an LNP parameter. A signaling processor is adapted to receive the signaling, to designate the search criteria, to process the call signaling and the LNP parameter from the result, to select a connection for the user communications, and to transmit a control message identifying the selected connection. A connection system is adapted to receive the user communications and the control message and, in response to the control message, to connect the user communications over the selected connection.

Further still, the present invention is directed to a system for connecting a call having call signaling and user communications. The system comprises a signaling processor that is adapted to receive the call signaling and to designate a search criteria for a search to determine if an LNP information element matches the search criteria. The signaling processor processes the call signaling and a result of the search, selects a processing option for the user communications, and transmits a control message identifying the selected processing option. An LNP cache has LNP information and is adapted to be searched using the search criteria to determine if the LNP information element exists in the LNP information. The search has the result. A connection system is adapted to receive the user communications and the control message and, in response to the control message, to process the user communications according to the processing option.

Further yet, the present invention is directed to a system for connecting a call having call signaling and user communications. The system comprises an LNP cache having LNP information. A signaling processor is adapted to receive the call signaling and to access the LNP information in the LNP cache to determine if a designated dialed number exists therein and, if existent, if the dialed number has an associated location routing number. The signaling processor processes the call signaling and a result of the access, selects a connection for the user communications, and transmits a control message identifying the selected connection. A connection system is adapted to receive the user communications and the control message and, in response to the control message, to connect the user communications on the selected connection.

Still, the present invention is directed to a method for connecting a call having call signaling and user communications. The method comprises receiving the signaling in the signaling processor and designating a search criteria by the signaling processor. LNP information in an LNP cache is searched to determine if the search criteria matches an LNP information element. The searching has a result. The result and the call signaling are processed. A connection for the user communications is selected and a control message identifying the selected connection is transmitted. The user communications and the control message are received and, in response to the control message, the user communications are connected over the selected connection.

Still, the present invention is directed to a method for connecting a call having call signaling and user communications. The method comprises receiving the signaling in the signaling processor and designating a search criteria by the signaling processor. LNP information in an LNP cache is searched to determine if the search criteria matches an LNP information element. The searching has a result. The result and the call signaling are processed. A processing option for the user communications is selected and a control message identifying the selected processing option is transmitted. The user communications and the control message are received and, in response to the control message, the user communications are processed according to the selected processing option.

In addition, the present invention is directed to a system for processing call signaling. The system comprises a signaling processor that receives the call signaling, processes the call signaling, and determines if a search criteria for a search matches an N00 information element. The signaling processor selects the search criteria for the search. The system further comprises an N00 cache having N00 information. The N00 cache is adapted to be searched using the search criteria to determine if the N00 information element exists in the N00 information. The search has a result.

BRIEF DESCRIPTION OF THE DRAWINGS

FIG. 5 is a functional diagram of an asynchronous transfer mode interworking unit for use with a synchronous optical network system in accordance with the present invention.

FIG. 6 is a functional diagram of an asynchronous transfer mode interworking unit for use with a synchronous digital hierarchy system in accordance with the present invention.

FIG. 12 is a table diagram of a time division multiplex trunk circuit table used in the signaling processor of FIG. 8.

FIG. 13 is a table diagram of an asynchronous transfer mode trunk circuit table used in the signaling processor of FIG. 8.

FIG. 14A is a table diagram of a trunk group table used in the signaling processor of FIG. 8.

FIG. 14B is a continuation table diagram of the trunk group table of FIG. 14A.

FIG. 14C is a table diagram of a continuation of the trunk group table of FIG. 14B.

FIG. 15 is a table diagram of a carrier table used in the signaling processor of FIG. 8.

FIG. 16 is a table diagram of an exception table used in the signaling processor of FIG. 8.

FIG. 17 is a table diagram of an originating line information table used in the signaling processor of FIG. 8.

FIG. 18 is a table diagram of an automated number identification table used in the signaling processor of FIG. 8.

FIG. 19 is a table diagram of a called number screening table used in the signaling processor of FIG. 8.

FIG. 20 is a table diagram of a called number table used in the signaling processor of FIG. 8.

FIG. 21 is a table diagram of a day of year table used in the signaling processor of FIG. 8.

FIG. 22 is a table diagram of a day of week table used in the signaling processor of FIG. 8.

FIG. 23 is a table diagram of a time of day table used in the signaling processor of FIG. 8.

FIG. 24 is a table diagram of a time zone table used in the signaling processor of FIG. 8.

FIG. 25 is a table diagram of a routing table used in the signaling processor of FIG. 8.

FIG. 26 is a table diagram of a trunk group class of service table used in the signaling processor of FIG. 8.

FIG. 27 is a table diagram of a treatment table used in the signaling processor of FIG. 8.

FIG. 28 is a table diagram of an outgoing release table used in the signaling processor of FIG. 8.

FIG. 29 is a table diagram of a percent control table used in the signaling processor of FIG. 8.

FIG. 30 is a table diagram of a call rate table used in the signaling processor of FIG. 8.

FIG. 31 is a table diagram of a database services table used in the signaling processor of FIG. 8.

FIG. 32A is a table diagram of a signaling connection control part table used in the signaling processor of FIG. 8.

FIG. 32B is a continuation table diagram of the signaling connection control part table of FIG. 32A.

FIG. 32C is a continuation table diagram of the signaling connection control part table of FIG. 32B.

FIG. 32D is a continuation table diagram of the signaling connection control part table of FIG. 32C.

FIG. 33 is a table diagram of an intermediate signaling network identification table used in the signaling processor of FIG. 8.

FIG. 34 is a table diagram of a transaction capabilities application part table used in the signaling processor of FIG. 8.

FIG. 35 is a table diagram of a external echo canceller table used in the signaling processor of FIG. 8.

FIG. 36 is a table diagram of an interworking unit used in the signaling processor of FIG. 8.

FIG. 37 is a table diagram of a controllable asynchronous transfer mode matrix interface table used in the signaling processor of FIG. 8.

FIG. 38 is a table diagram of a controllable asynchronous transfer mode matrix table used in the signaling processor of FIG. 8.

FIG. 39A is a table diagram of a site office table used in the signaling processor of FIG. 8.

FIG. 39B is a continuation table diagram of the site office table of FIG. 39A.

FIG. 39C is a continuation table diagram of the site office table of FIG. 39B.

FIG. 39D is a continuation table diagram of the site office table of FIG. 39C.

FIG. 40A is a table diagram of an advanced intelligent network event parameters table used in the signaling processor of FIG. 8.

FIG. 40B is a continuation table diagram of the advanced intelligent network event parameters table of FIG. 40A.

FIG. 41 is a table diagram of a message mapping table used in the signaling processor of FIG. 8.

DETAILED DESCRIPTION OF THE PREFERRED EMBODIMENTS

Figure 1:
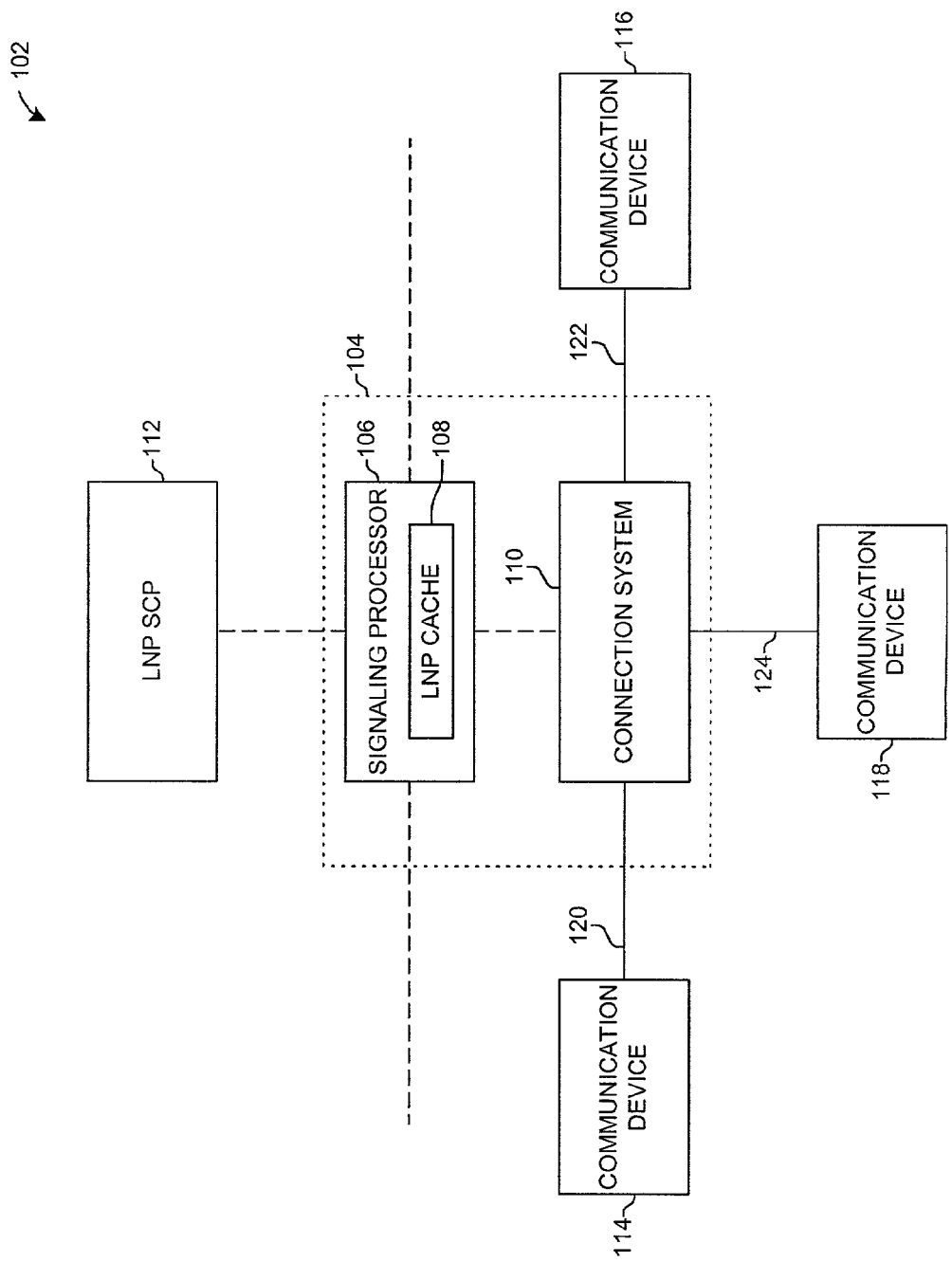
FIG. 1 is a block diagram of a caching system of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, user datagram protocol/internet protocol (UDP/IP), ethernet, digital signal level zero (DS0), or digital signal level one (DS1). In addition, a link, as shown in the figures, can represent a single physical link or multiple links, such as one link or a combination of links of ISDN, SS7, transmission control protocol/internet protocol (TCP/IP), or some other data link. The term "control message" as used herein means a control or signaling message, a control or signaling instruction, or a control or signaling signal, whether proprietary or standardized, that conveys information from one point to another.

When a signaling processor receives call signaling, it processes the call signaling to determine connections or other processing options, such as resources or services, for the call. The call signaling typically contains such information as the calling party number, the called party dialed number (DN), the trunk group, the circuit identification code (CIC), and other information. This information can be provided through a variety of call signaling formats, such as signaling system #7 (SS7), C7, integrated services digital network (ISDN), and digital private network signaling system (DPNSS), all of which can be processed by the present system. An example of a call signaling message for SS7 is an initial address message (IAM). The term "signaling processor" includes any switch or other call processor, whether integrated with a connection system or not so integrated, that receives call signaling or control messages of any type or format, standardized or private, and processes the call signaling or control message.

Standardized signaling formats provide that ported number information can be transmitted with the call signaling. If a dialed number is ported, a location routing number (LRN) identifies the signaling processor that is assigned to the DN. If a signaling processor identifies a DN as being ported, and if the signaling processor determines the LRN for the call, the LRN can be included in the call signaling.

For example, in SS7 signaling, an IAM has a called party number (CdPN) parameter that contains the DN of the call. If a signaling processor determines that a DN is ported, a ported number generic address parameter (GAP) is added to the call signaling, the DN is stored in the ported number GAP, and the LRN is stored in the CdPN field. In addition, a forward call indicator (FCI) parameter for ported numbers, such as bit M, is set to specify that the call signaling has been translated for ported number identification.

If a switch or call processor determines that the DN is not ported, the DN is stored in the CdPN, the ported number GAP is not added, and the FCI parameter is set to "translated" if a query was made to identify whether or not the DN is ported. If no query was made, the FCI parameter is not set and specifies "not translated". Examples of switching and signaling for ported numbers are discussed in the American National Standards Institute (ANSI) technical requirements documents: Technical Requirements for Number Portability-Switching Systems and Technical Requirements for Number Portability-Database and Global Title Translations, the contents of which are incorporated herein by reference.

By processing the information in the call signaling, the signaling processor may be able to determine that the called number is assigned to a portable switch, not assigned to a portable switch, or that the number is ported as exemplified above. As above, if the call signaling identifies the DN as ported or as not ported, then the call can be routed without further LNP processing. However, if LNP information is not specified in the call signaling, thereby not identifying that the DN may be ported or as specifically not ported, and if the signaling processor identifies the DN as assigned to a portable signaling processor, then a query must be made to obtain the LNP information and to determine if the DN is ported. For SS7 signaling, this LNP information may include one or more LNP parameters, such as the DN, the LRN, the ported number GAP, the FCI parameter for calls to ported numbers, other parameters for calls to ported numbers, and/or other routing information that may be used for ported and non-calls to ported numbers as identified in the call signaling. One skilled in the art will appreciate that other routing and LNP parameters are included as LNP information for other signaling types.

In addition to LNP, toll free 800 or N00 numbers need translation to destination numbers that can handle calls. After a caller dials a N00 number, the signaling processor receives the call signaling and transmits a query to a N00 SCP for a N00 number translation. The N00 SCP translates the N00 number to a destination number that handles the call and replies to the signaling processor with the translated number. The N00 number may have multiple destinations that handle calls for the N00 number. The N00 SCP performs the translation based on various criteria such as time of day, date, and originating number. For example, if a caller dials 1-800-FLOWERS at night, the N00 SCP translates the 800 number using time of day to a destination number for a west coast flower shop that is open later than an east coast flower shop. In another example, if a west coast caller dials 1-800-FLOWERS, the N00 SCP translates the 800 number using originating number to a destination number for a west coast flower shop that handles west coast calls.

The system of the present invention provides a memory cache, referred to herein as the LNP cache, in which local number portability (LNP) information is stored. The LNP cache allows a signaling processor to store and to quickly access the LNP information that is in the cache, rather than requiring the switch or other signaling processor to query an LNP SCP for every call that is assigned to a portable signaling processor. The system of the present invention can access the LNP cache to determine if the information it seeks is available. If the signaling processor determines that the LNP information it seeks is not accessible from the LNP cache, it then can query an LNP SCP if necessary.

It will be appreciated that the LNP cache provides a signaling processor quick access to LNP information. This allows the signaling processor to more quickly process calls and the call signaling associated with the calls and to determine routes, processing options, and connections for the calls. In addition, because fewer queries are made to the LNP SCP, a cost savings is realized for the owner of the signaling processor. Moreover, link usage for access to communication devices is reduced due to the reduced query/response traffic to and from the LNP SCP.

FIG. 1 illustrates an exemplary embodiment of a call connecting system of the present invention. The call connecting system 102 comprises a call routing system 104 having a signaling processor 106, a local number portability (LNP) cache 108, and a connection system 110, a local number portability service control point (LNP SCP) 112, and communication devices 114–118. The connection system 110 is connected to the communication devices 114–118 by the connections 120–124, respectively.

The call routing system 104 receives call signaling and user communications. The call routing system 104 processes the call signaling to determine routes for the user communications and to determine new call signaling. The routing system 104 makes connections for user communications and transmits new call signaling to the communication devices.

The signaling processor 106 is a signaling platform that can receive, process, and generate call signaling. Based on the processed call signaling, the signaling processor 106 selects processing options such as services or resources for the user communications and generates and transmits control messages that identify the communication device, processing option, service, and/or resource that is to be used. The signaling processor 106 also selects other processing options, such as virtual connections and circuit-based connections for call routing, and generates and transports control messages that identify the selected connections. The signaling processor 106 can process various forms of signaling, including ISDN, GR-303, B-ISDN, SS7, and C7. The signaling processor 106 uses routing logic and routing tables to process the call signaling. The signaling processor 106 can be identified as a communication device.

The signaling processor 106 determines, based on the call signaling, whether a number may be a ported number. The signaling processor 106 processes the call signaling to determine if the NPA-NXX in the CdPN belongs to a portable signaling processor. In addition, the signaling processor 106 determines if a ported number parameter (PNP) is present. A PNP identifies the call as connecting to a ported DN. Examples of a PNP are one or both of the FCI parameter and the ported number GAP.

The signaling processor 106 determines whether the LNP cache 108 should be accessed to search for the LNP information in the LNP cache, such as an LRN, if existent, and/or whether a query should be sent to the LNP SCP 112 to obtain the LNP information, such as an LRN, if existent. The signaling processor 106 determines whether the information received as a result of a search from the LNP cache 108 or received in a response from the LNP SCP 112 contains an LRN, a DN, or other LNP information and processes the information to determine processing options and connections for calls.

The LNP cache 108 contains LNP information such as one or more LNP parameters and other call signaling parameters. LNP parameters may include the DN, the LRN, the ported number GAP, the FCI parameter for calls to ported numbers, other parameters for calls to ported numbers, and/or other routing information that may be used for ported and non-calls to ported numbers as identified in the call signaling.

The LNP information can be arranged in any convenient format. For example, the LNP information can be placed in a database table as LNP information entries in volatile memory or non-volatile memory. Preferably, the LNP information in the LNP cache 108 is located in non-volatile memory and includes LNP information elements, such as the DN, a number that is the same as the DN, the LRN, the first date the DN or LRN was stored and/or used, the number of uses for a particular set of LNP information, and the number of attempts to access any of the LNP information, such as the number of attempts to access a DN. More information elements, fewer information elements, or other information elements may be used. For example, the LNP information may include only DNs and LRNs.

The LNP information can be placed in and or updated in the LNP cache 108 on a call-by-call basis. Also, the LNP information can be pre-loaded to the LNP cahce 108, loaded to the LNP cache, or updated at any time from a management system or another system.

The LNP information can be organized in other formats. For example, the LNP information can be located in memory registers.

The LNP cache 108 can be configured to handle N00 numbers, non-N00 numbers, or both. Thus, in a first configuration, the LNP cache 108 may have a plain old telephone service (POTS) DN entry and a corresponding LRN entry. In a second configuration, the LNP cache 108 may have an N00 DN entry, a POTS translated number entry that corresponds to the N00 DN entry, and an LRN entry. In a third configuration, the LNP cache 108 may have an entry that can handle either a POTS DN or an N00 DN and an entry for the corresponding LRN. In a fourth configuration, the LNP cache 108 may have an N00 DN entry and a corresponding LRN entry.

Processing efficiencies may be gained when N00 numbers are handled by a separate LNP cache where N00 numbers have multiple possible destination and require greater processing. Preferably, both N00 numbers and non-N00 numbers are handled by a single LNP cache 108.

The LNP cache 108 can be configured to have DN entries that have corresponding LRN entries. The LNP cache 108 also can have a second configuration that includes DN entries that have a corresponding entry that is the same number as the DN, a corresponding blank entry, or another non-LRN identifier entry. This second configuration allows the LNP cache 108 to include numbers for which a query for a DN has previously been made to the LNP SCP 112 and a response from the LNP SCP indicated that the DN did not have a corresponding LRN, and was therefore not ported. In this second configuration, additional time and processing is saved by not having to query the LNP SCP 112 for numbers that are not ported. In this second configuration, DN entries that have a corresponding entry that is the same number as the DN, a corresponding blank entry, or another non-LRN identifier entry may be loaded from another source, such as a management system.

Thus, in a first configuration, the LNP cache 108 is configured as a table with a entry for the DN and a corresponding entry for an LRN. This configuration does not include listings for DNs that do not have corresponding LRNs. This configuration does not include listings for DNs that have a corresponding entry with the same number as the DN. In this configuration, if a match is not found for the DN, a query can be sent to the LNP SCP 112.

In a second configuration, the LNP cache 108 is configured as a table with an entry for a DN and a corresponding second entry that can have either a corresponding LRN or the same number as the DN. In this second configuration, if a match is found for the DN, either an LRN or the same number as the DN will be returned.

If the same number as the DN is returned, in one configuration this signifies that a query previously had been sent to the LNP SCP 112, and the LNP SCP responded with the DN for the call and not an LRN. This DN was then stored in the LNP cache 108 so that if a match was found later for that DN in the LNP cache and the corresponding entry was the same number as the DN, then a query would not need to be sent to the LNP SCP 112. In this example, the same number as the DN would be sent to the signaling processor 106, the signaling processor would not query the LNP SCP 112, and the signaling processor would process the same number as the DN to determine a route for the call. In addition, in other configurations, entries with DNs that have corresponding entries with the same numbers as the DNs can be pre-loaded in the table.

In this configuration, if a match is not found for the DN, the LNP cache 108 can be configured to respond to the signaling processor with a control message signifying that no match was located, such as a blank field, a control code, an error code, or some other response. In this configuration, if a match is not found for the DN, a query can be sent to the LNP SCP 112.

In a third configuration, the LNP cache 108 is configured as a table with an entry for a DN and a corresponding second entry that can have a corresponding LRN or a blank. In this third configuration, if a match is found for the DN, either an LRN or a blank will be returned.

In one configuration, if the blank is returned, this signifies that a query previously had been sent to the LNP SCP 112, and the LNP SCP responded with the DN for the call and not an LRN. This DN was then stored in the LNP cache 108 so that if a match was found later for that DN in the LNP cache and the corresponding entry was a blank, then a query would not need to be sent to the LNP SCP 112. In this example, the blank would be sent to the signaling processor 106, the signaling processor would not query the LNP SCP 112, and the signaling processor would process the DN to determine a route for the call. Other items, including control message, corresponding to the DN may be entries in the LNP cache 108 to signify that the DN previously had been determined to not have an LRN. In addition, in other configurations, entries with DNs that have corresponding entries with blanks can be pre-loaded in the table.

In this configuration, if a match is not found for the DN, the LNP cache 108 can be configured to respond to the signaling processor with a control message signifying that no match was located, such as the DN, a control code, an error code, or some other response. In this configuration, if a match is not found for the DN, a query can be sent to the LNP SCP 112.

One or multiple search criteria may be used to locate information in the table, including indices for the table lookup, examples of which are the LNP information specified above. Preferably, the primary index for the search criteria is based on the DN. However, other search criteria and other indices may be used.

The table size can be defined by user parameters and specified on an individual basis at an optimization level to optimize the processing by the signaling processor 106, or other signaling processor, with which it is associated. The optimization can be specified by determining the size of the LNP cache with a total number of entries and the processing time that it takes to traverse the total number of entries. For example, for a specified signaling processor, the optimization level may occur at 500,000 entries or higher. Other signaling processors may have optimization level occurring at 25,000 entries or lower. Of course, the optimization level may occur there between. The optimization level must take into account the time limits needed to completely process a call for call routing. In one example, the present invention has an optimization level of 100,000 entries.

In addition, the table can have maintenance parameters, such as a user definable refresh parameters so that if a set of LNP information elements is not accessed within a specified time or under specified conditions, that set of LNP information elements are deleted. For example, the LNP cache can be configured so that if a set of LNP information elements is not accessed within the last 30 days, it would be deleted. The time period may be any configurable time, including 15 or fewer days, 30 days, 45 days, 60 days, or 120 or more days. Other time increments may be used.

Also, if another specified condition, such as error condition, is associated with the LNP information from the signaling processor 106 or another signaling processor, the LNP information can be deleted. For example, if a terminating signaling processor transmits an error message to the signaling processor 106 specifying that the LNP information in the call signaling had an error, such as the specified LRN does not belong to the specified DN, then the designated LNP information elements can be deleted. An example of such a message is an SS7 Release message having a cause code value of 26. Other examples include other messages, messages having other error indicators, or messages having provisioning information.

A manual dump of the LNP information elements can be made as well. This can occur for a set of information elements of for the whole table.

The table can be configured to update itself if specified update criteria are met. For example, if an update criteria is met, such as an error condition received from another signaling processor, the entries which pertain to the update criteria, in this case the error condition, are updated. The requisite information is obtained from the LNP SCP 110, and the new LNP information is overlaid on the old LNP information. In addition, old LNP information can be updated at any time.

The LNP cache 108 can be configured to make a query in the background-mode of the processing, and the response also would be processed in the background-mode. Preferably, this occurs in less than 500 milli-seconds.

The LNP cache 108 can be configured so that when the table becomes full and new LNP information elements are to be placed in the table, the table deletes old LNP information elements or expands the table. Preferably, if the optimization level of the table is defined as containing a specified number of entries with LNP information elements, old LNP information elements will be deleted based on maintenance criteria, such as not having been accessed for a specified period of time, having been accessed the least number of times, or having been placed in the table and/or accessed at a time period longer than other LNP information elements.

The LNP cache 108 has processing logic that handles out of sync conditions that may occur between the LNP cache database table and external databases from which LNP information may be received or to which LNP information may be transmitted. In addition, the processing logic can be configured to delete the whole table due to data corruption or to delete individual entries or ranges of entries, such as by the NPA-NXX or the LRN. If a table is deleted, the processing logic will reload the table from a redundancy backup database table. The backup database table can be stored in the signaling processor or a management system, such as the call process control system (CPCS) described below.

One or more of the DN, the LRN, number of attempts, accesses, and usage of the LNP information are collected as performance data and used for accounting and maintenance purposes. The performance data can be queried and used for trouble shooting to determine where and when errors occur. In addition, the performance data is compiled and transmitted as accounting data. Thus, for example, a user can determine if money is being saved by using the LNP cache 108 and the amount of the savings. Also, the accounting data can be used for marketing purposes and the performance data can be used for congestion control, each to determine quantities of traffic for specified DNs.

Preferably, the LNP cache 108 has an associated accounting system and a maintenance system. The accounting system compiles the performance data. The historical view of the performance data can be reviewed, and billing and other accounting applications used to process the performance data to determine costs and cost savings associated with access to the LNP cache 108 on a call-by-call basis and to determine costs and cost savings for call connections.

The maintenance system is used to review error conditions, exception conditions, and completed accesses to the LNP cache 108. The maintenance system provides access to control the refresh parameters, update conditions, and other maintenance conditions for the LNP cache 108.

The accounting and maintenance systems can be co-located with the LNP cache 108 or in the signaling processor 106 or management system, such as the below described CPCS. Location of the accounting system and the maintenance system for the LNP cache 108 in the CPCS is preferred.

The LNP cache 108 can be configured to be accessed directly from the signaling processor 106. In this configuration, the signaling processor 106 searches the LNP cache 108 through a direct access to obtain the LNP information. The signaling processor 106 reads the result of the search, if existent, from the LNP cache table 108. This configuration is preferred.

Alternately, the LNP cache 108 can be configured so that the signaling processor queries the LNP cache 108 as a database table. The LNP cache 108 performs a lookup of the table based on the search criteria, such as an index, provided in the query from the signaling processor 106. The LNP cache 108 transmits/sends the results to the signaling processor 106 as a response. Alternately, the LNP cache 108 can write the results to a memory location in the signaling processor 106 or to a location designated for the response. It will be appreciated that these two configurations are similar and differ merely by verbiage of one skilled in the art. As used herein, the term "access", the term "search", and the term "query" can be used as alternates for each other, and the terms "result of a search" or "search result" and the term "response" can be used as alternates for each other.

The connection system 110 makes connections for calls. The connection system 110 may interwork user communications to connections and/or switch user communications between connections. Preferably, interworking occurs between time division multiplex (TDM) connections and asynchronous transfer mode (ATM) connections. Preferably, switching occurs between ATM connections and other ATM connections and between TDM connections and other TDM connections. The connection system 110 establishes connections for user communications in response to control messages from the signaling processor 106. The connection system 110 can be identified as one or more communication devices.

The LNP SCP 112 is a database that contains ported number information. The LNP SCP 112 responds to LNP queries made from switches or other call processors. The LNP SCP 112 responds with ported number information. The LNP SCP 112 responds with an LRN for dialed numbers that have been ported or with the actual dialed number digits, and not an LRN, for dialed numbers that are not ported. The LNP SCP 112 can be identified as a communication device.

The communication devices 114–118 comprise other call routing systems such as the call routing system 104, a connection system such as the connection system 110, customer premises equipment (CPE), a service platform, a signaling processor, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header virtual path/virtual channel (VP/VC) identifiers.

The system of FIG. 1 operates as follows. In a first example, LNP information entries are loaded and existent in the LNP cache 108 either from prior queries to the LNP SCP 112 or from being pre-loaded. The communication device 114 transmits call signaling to the signaling processor 106 and user communications to the connection system 110.

The signaling processor 106 receives the call signaling and processes the call signaling. The signaling processor 106 determines that the called party is associated with a portable signaling processor.

The signaling processor 106 queries the LNP cache 108 to determine if the DN of the call is present in the LNP cache. In this example, the signaling processor 106 designates the DN of the call as the search criteria. The LNP cache 108 performs the lookup into the database table using the DN as the main lookup index. The LNP cache 108 determines that the DN is present in the LNP information and that the DN has an associated LNP information element, which is an LRN.

The LNP cache 108 responds to the query with the LRN. Also, the LNP cache 108 collects performance data of the query, including the DN, the LRN, the date and time of the query, any operation measures (OMs), and peg counts. The performance data is stored and/or compiled for the accounting system and the maintenance system.

The signaling processor 106 uses the LRN from the response to further process the call to determine one or more connections for the call. The signaling processor 106 determines that the call is to be transmitted to the communication device 116 and selects the connection 122 to the communication device.

The signaling processor 106 transmits a control message to the connection system 110 designating the selected connection. The connection system 110 receives the user communications and the control message and, in response to the control message, connects the user communications to the selected connection 122.

Because the signaling processor 106 did not have to build and transmit a query to the LNP SCP 112, and the LNP SCP did not have to build and transmit a response to the signaling processor, significant time and processing resources are saved. In addition, neither the signaling processor 106 nor the LNP SCP 112 had to tear down the response or query, respectively, to process the call signaling parameters therein. This saves additional time and processing resources.

Also, because the LNP cache 108 has memory locations within the signaling processor 106, the signaling processor merely has to access the LNP cache, and special call signaling queries and special call signaling responses, such as those required for communication with the LNP SCP 112, do not have to be built or processed. This results in additional saved time and processing resources.

In another example, the LNP cache 108 is configured as a table with an entry for the DN and a corresponding entry for an LRN. This configuration does not include listings for DNs that do not have corresponding LRNs. This configuration does not include listings for DNs that have a corresponding entry with the same number as the DN.

The signaling processor 106 receives call signaling for the call. The communication device 116 transmits user communications for the call to the connection system 110.

The signaling processor 106 processes the call signaling. The signaling processor 106 determines that the called party is associated with a portable signaling processor.

The signaling processor 106 queries the LNP cache 108 to determine if the DN of the call is present in the LNP cache. In this example, the signaling processor 106 designates the DN of the call as the search criteria. The LNP cache 108 performs a search of the table using the DN as the search criteria. The LNP cache 108 does not locate a match for the search criteria in the LNP information.

In this example, the LNP cache 108 is configured to respond to the query with a message signifying that a DN match was not identified. This response can return the DN, thereby identifying the query as not finding a DN match. Alternately, the response can be a specific control message that specifies that a DN match was not found. In this example, the LNP cache 108 writes the DN to the signaling processor 106.

Also, the LNP cache 108 collects performance data of the query, including the DN, the date of the query, any OMs, and peg counts. The performance data is stored and/or compiled for the accounting system and the maintenance system.

The signaling processor 106 transmits a query to the LNP SCP 112. The LNP SCP 112 processes the query to determine if the DN exists in its LNP information. The LNP SCP 112 will return the LRN if the DN is located, or it will return the DN if no match is located. In this example, the LNP SCP 112 responds with an LRN for the call.

The signaling processor 106 uses the LRN from the response to further process the call to determine one or more connections for the call. The signaling processor 106 determines that the call is to be transmitted to the communication device 114 and selects the connection 120 to the communication device.

The signaling processor 106 updates the LNP information in the LNP cache 108 with the LNP information received from the LNP SCP 112. Also, the signaling processor 106 transmits a control message to the connection system 110 designating the selected connection 120. It will be appreciated that the update to the LNP information in the LNP cache 108 and the transmission of the control message can occur in any order or concurrently.

In addition, the LNP cache 108 collects performance data of the update from the signaling processor 106, including the DN, the LRN, the date of the query, any OMs, and peg counts. The performance data is stored and/or compiled for the accounting system and the maintenance system.

The connection system 110 receives the user communications and the control message. In response to the control message, the connection system 110 connects the user communications to the selected connection 120.

In another example, the LNP cache 108 is configured as a table with an entry for a DN. A second entry can be configured either to have a corresponding LRN or to have the same number as the DN, a blank, or some other non-LRN value or message. In this example, the second entry is configured to have a corresponding LRN or the same number as the DN, depending on whether the number is ported or not ported, respectively. In this second configuration, if a match is found for the DN, either an LRN or the same number as the DN will be returned. If the same number as the DN is returned, this signifies that a query previously had been sent to the LNP SCP 112, and the LNP SCP responded with the DN for the call and not an LRN. This DN was then stored in the LNP cache 108 so that if a match was found later for that DN in the LNP cache and the corresponding entry was the same number as the DN, then a query would not need to be sent to the LNP SCP 112. In this example, if a match is not found in the table for the DN, then the LNP cache 108 responds with a control message signifying that a match was not located.

In this example, the same number as the DN would be sent to the signaling processor 106, the signaling processor would not query the LNP SCP 112, and the signaling processor would process the same number as the DN to determine a route for the call. In this configuration, if a match is not found for the DN, a query can be sent to the LNP SCP 112.

The signaling processor 106 receives call signaling for the call, and the communication device 116 transmits user communications for the call to the connection system 110. The signaling processor 106 processes the call signaling and determines that the called party may be associated with a portable signaling processor.

The signaling processor 106 queries the LNP cache 108 to determine if the DN of the call is present in the LNP cache 108. In this example, the signaling processor 106 designates the DN of the call as the search criteria. The LNP cache 108 performs a search of the table using the DN as the search criteria. The LNP cache 108 locates a match for the search criteria in the LNP information.

In this example, the LNP cache 108 matches the DN search criteria to a DN entry in the table. The DN entry in the table has a corresponding entry that is the same number as the DN search criteria. The LNP cache 108 responds to the signaling processor 106 with the same number as the DN search criteria.

Also, the LNP cache 108 collects performance data of the query, including the DN, the date of the query, any OMs, and peg counts. The performance data is stored and/or compiled for the accounting system and the maintenance system.

The signaling processor 106 uses the response from the LNP cache 108 to further process the call to determine one or more connections for the call. The signaling processor 106 determines that the call is to be transmitted to the communication device 114 and selects the connection 120 to the communication device.

The connection system 110 receives the user communications and the control message. In response to the control message, the connection system 110 connects the user communications to the selected connection 120.

In another example, LNP information entries are loaded and existent in the LNP cache 108 either from prior queries to the LNP SCP 112 and/or from being pre-loaded. The communication device 118 transmits call signaling to the signaling processor 106 and user communications to the connection system 110.

The signaling processor 106 receives the call signaling and processes the call signaling. The signaling processor 106 determines that the called party is associated with a portable signaling processor.

The signaling processor 106 accesses the LNP cache 108 to determine if the DN of the call is present in the LNP information of the LNP cache. In this example, the signaling processor 106 uses the DN of the call as the main search criteria to search the LNP cache 108. The signaling processor 106 searches the LNP information of the LNP cache 108 and locates a match for the DN search criteria.

The signaling processor 106 reads the search results from the LNP cache 108. In this example, the signaling processor 106 reads from the LNP cache 108 the LRN and any other LNP information elements in the LNP information entry containing the DN and the LRN. Also, the LNP cache 108 collects performance data of the access and search, including the DN, the LRN, the date of the query, any OMs, and peg counts. The performance data is stored and/or compiled for the accounting system and the maintenance system.

The signaling processor 106 uses the LRN to further process the call to determine one or more connections for the call. The signaling processor 106 determines that the call is to be transmitted to the communication device 116 and selects the connection 122 to the communication device.

The signaling processor 106 transmits a control message to the connection system 110 designating the selected connection. The connection system 110 receives the user communications and the control message and, in response to the control message, connects the user communications to the selected connection 122.

The signaling processor 106 also transmits new call signaling to the communication device 116. The communication device 116 receives and processes the new call signaling. The communication device 116 determines that the DN is not assigned to that communication device and that there is an error condition. The communication device 116 transmits additional call signaling back to the signaling processor 106 specifying the error condition.

The signaling processor 106 deletes the LNP information entries in the LNP cache 108 for the requisite DN and LRN that are in error. The signaling processor 106 transmits a query to the LNP SCP 112 identifying the DN and requesting the LNP information.

The LNP SCP 112 processes the query to determine if the search criteria matches a DN in its LNP information. The LNP SCP 112 will return an LRN if a match to the DN is located, or it will return the DN if no match is located. In this example, the LNP SCP 112 responds with an LRN.

The signaling processor 106 receives and processes the response from the LNP SCP 112. If the LRN received from the LNP SCP 112 is different from the LRN in the LNP Cache 108, then the signaling processor 106 writes the LNP information received from the response to the LNP cache 108, thereby updating the entry in the LNP cache 108 for that DN. If the LRN received from the LNP SCP 112 is the same as the LRN in the LNP cache 108, then an error condition exists, The signaling processor 106 can be configured to release the call upon this error condition.

In this example, the LRN received from the LNP SCP 112 is different from the LRN in the LNP Cache 108. Therefore, the signaling processor 106 updates the LNP cache 108.

In addition, the LNP cache 108 collects the performance data for the update and stores and/or compiles the data in the accounting system and the maintenance system.

Note that in other embodiments, the signaling processor 106 sends the LNP information to the LNP cache 108. The LNP cache 108 then updates the entry for the DN.

In yet another example, and only this example, the signaling processor 106 is configured so that it is not able to process or route calls that are identified as exception traffic. In this example, exception traffic means that the call is to be processed by another signaling processor. This may occur when the call signaling is to be processed by a signaling processor having an enhanced service processor/platform (ESP), such as a voice response unit or a media response unit.

The signaling processor 106 receives call signaling for the call. The connection system 110 receives user communications for the call.

The signaling processor 106 processes the call signaling. The signaling processor 106 determines that the call is an exception call.

The signaling processor 106 determines that the call is to be routed to the communication device 114 for further processing. In this example, the communication device 114 has an ESP. The signaling processor 106 transmits new call signaling to the communication device 114 and a control message to the connection system 110 designating the connection 120 as the selected connection. The connection system receives the control message and, in response thereto, connects the user communications over the selected connection 120.

In a further example, the communication device 116 transmits call signaling to the signaling processor 106 and transports user communications to the connection system 110. The signaling processor 106 processes the call signaling. The signaling processor 106 determines that the call signaling parameters have a PNP, and the DN is ported. In this example, the PNP is both the existence of the FCI parameter, which is set to "translated", and a ported number GAP. The CdPN has the LRN for the call, and the ported number GAP has the DN for the call.

The signaling processor 106 processes the LRN, as well as the other parameters in the call signaling, including the DN from the ported number GAP, to determine routing for the call. The signaling processor 106 determines that the communication device 114 is to receive the call and selects the connection 120 over which the user communications will be transported. The signaling processor 106 transmits a control message to the connection system 110 designating the selected connection 120. In addition, the signaling processor 106 builds and transmits new call signaling to the communication device 114 over a link.

The connection system 110 receives the user communications and the control message. In response to the control message, the connection system 110 connects the user communications to the selected connection 120.

It will be appreciated that, in this example, the signaling processor 106 received LNP information in the call signaling, and the signaling processor alternately may be configured to send the LNP information to the LNP cache 108. Because the signaling processor 106 received in the call signaling a DN, an LRN for the DN, and other LNP information elements, the signaling processor can provide this information to the LNP cache 108 so that the LNP cache can update the database tables. In addition, the LNP cache 108 can be configured to accept this update LNP information, overlay the update LNP information over the old LNP information, synchronize the update LNP information with the old LNP information if an error condition is produced by the two pieces of information being out of sync, query the LNP SCP 112 if an error condition occurs if the update LNP information does not match with the old LNP information, or provide other maintenance on the information.

In still another example, the communication device 118 transmits call signaling to the signaling processor 106 and transports user communications to the connection system 110. The signaling processor 106 processes the call signaling. The signaling processor 106 determines that the call signaling parameters do not have a PNP, and the DN is not assigned to a portable switch to other call processor. In this example, the CdPN has the DN for the call.

The signaling processor 106 processes the DN, as well as the other parameters in the call signaling, to determine routing for the call. The signaling processor 106 determines that the communication device 116 is to receive the call and selects the connection 122 over which the user communications will be transported. The signaling processor 106 transmits a control message to the connection system 110 designating the selected connection 122. In addition, the signaling processor 106 builds and transmits new call signaling to the communication device 116 over a link.

The connection system 110 receives the user communications and the control message. In response to the control message, the connection system 110 connects the user communications to the selected connection 122.

In a further example, the LNP cache 108 has collected performance data for multiple queries and responses. The LNP cache 108 formats the performance data so that the cost and cost savings associated with the operation and performance of the LNP cache can be determined. In this example, the formatted performance data includes the attempts made to determine an LRN for a DN, the matches made for a DN and an LRN, the usage for a DN, the usage for an LRN, and the dates and times that the attempts and usages were made. This accounting information is accessed and transmitted by the signaling processor 106 to a communication device (not shown). In this example, the communication device is an accounting system which processes the performance data to determine the cost associated with designated calls, designated DNs, designated LRNs, queries to the LNP cache 108, and queries made and queries not made to the LNP SCP 112.

In still another example, the LNP cache 108 has collected performance data for multiple accesses to the LNP information. The LNP cache 108 locates performance data in a formatted table. The formatted performance data includes the LNP information for entries including the DN, the LRN, the attempts and usage for the DNs and the LRNs, and the dates and times that the attempts and usages were made. An error condition occurs in the processing of LNP information obtained form the LNP cache 108. A user accesses the performance data to determine the error in the LNP information. The error is located and deleted. The correct LNP information is obtained by the signaling processor 106 and written to the LNP cache 108 for location in the table.

In another example, the LNP cache 108 receives LNP information from the signaling processor 106. The LNP information is to be put in the table. However, the table is full based on the number of entries allocated to the table. In this example, the table is allocated 50,000 entries. The LNP cache 108 performs maintenance on the table and determines the entry of LNP information that is least used based on the number of attempts for the DN of that entry. The LNP cache 108 deletes the least used entry and adds the entry for the new LNP information.

In a further example, the LNP cache 108 receives LNP information from the signaling processor 106. The LNP information is to be put in the table. However, the table is full, based on the number of entries specified in the optimization level for the table. In this example, the optimization level is specified at 100,000 entries. The LNP cache 108 performs maintenance on the table and determines the first entry of LNP information that was stored in the table based on chronologically timed entries. The LNP cache 108 deletes the first entry and adds the entry for the new LNP information. In another example, the LNP cache 108 performs self maintenance on the table. In this example, the table is allocated 200,000 entries. The LNP cache 108 determines that some entries of LNP information have not been accessed within the configured period of time. In this example, the configured period of time is 45 days. The LNP cache 108 deletes the entries.

Figure 2:
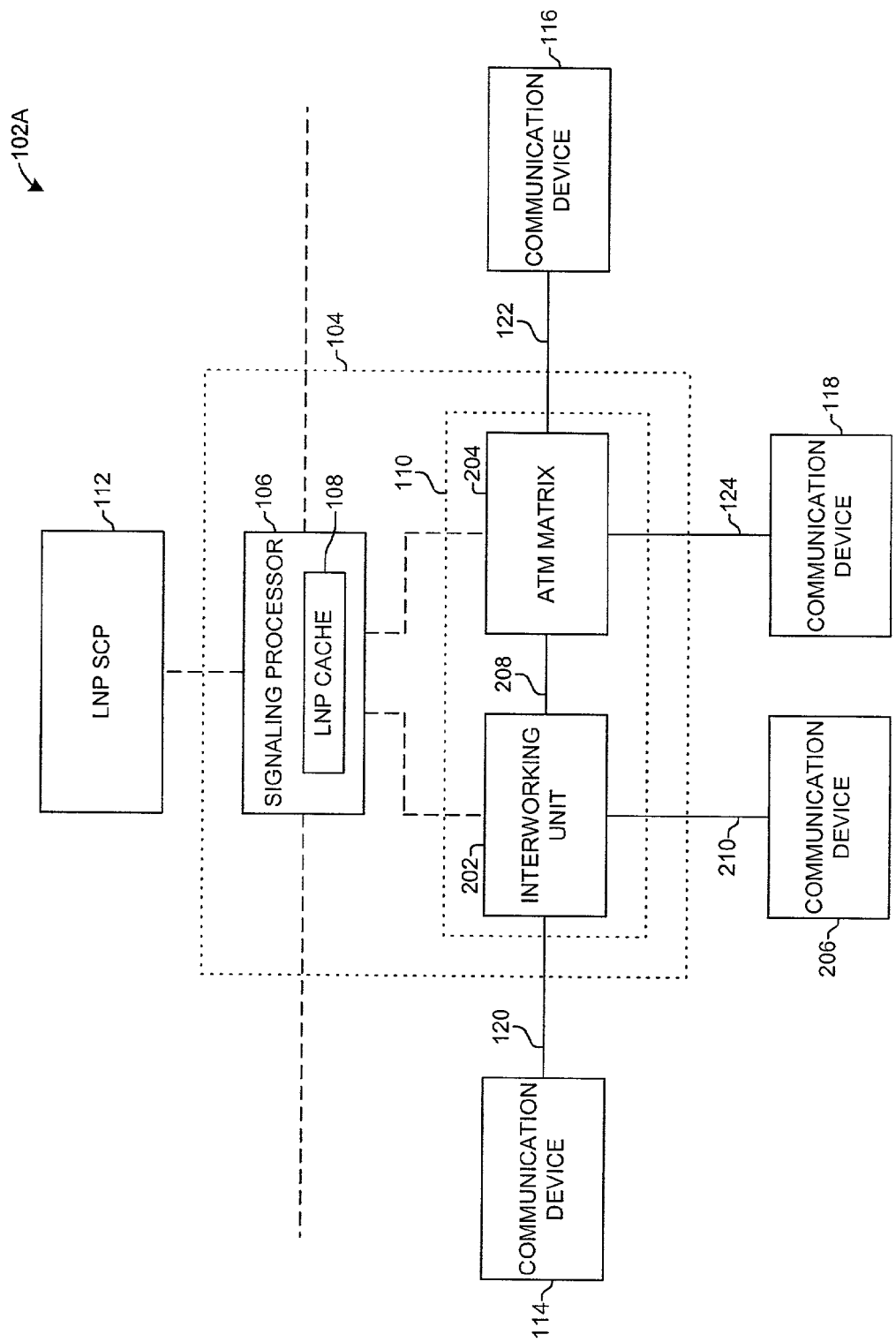
FIG. 2 is a block diagram of a caching system with an embodiment of a connection system of the present invention.

FIG. 2 illustrates an exemplary embodiment of a call connecting system of the present invention with an embodiment of a connection system. The connecting system 102A of FIG. 2 comprises, in addition to the elements of FIG. 1, an interworking unit 202, an asynchronous transfer mode (ATM) matrix 204, and a communication device 206. The interworking unit 202 is connected to the ATM matrix 204 by a connection 208 and to the communication device 206 by a connection 210. It will be appreciated that other embodiments are possible.

It will be appreciated that other communication devices may be present in the connection system 110 of FIG. 2. For example, the connection system of FIG. 2 may have a TDM controllable matrix that makes TDM connections to other TDM connections in response to a control message from the signaling processor 106 identifying the connections. Moreover, the connection system 110 of FIG. 2 may have only an interworking unit, only an ATM matrix, only a TDM matrix, or any combination of the interworking unit, the ATM matrix, and the TDM matrix.

The interworking unit 202 interworks traffic between various protocols. Preferably, the interworking unit 202 interworks between ATM traffic and non-ATM traffic, such as TDM traffic. The interworking unit 202 operates in accordance with control messages received from the signaling processor 106. These control messages typically are provided on a call-by-call basis and typically identify an assignment between a digital signal level zero (DS0) and a VP/VC for which user communications are interworked. In some instances, the interworking unit 202 may transport control messages which may include data to the signaling processor 106. In some instances, the interworking unit 202 can be configured to switch user communications from TDM connections to other TDM connections. The TDM to TDM switching functionality can be a sole configuration or a joint configuration with the TDM to ATM interworking functionality. The interworking unit 202 can be identified as a communication device.

The ATM matrix 204 is a controllable ATM matrix that establishes connections in response to control messages received from the signaling processor 106. The ATM matrix 204 is able to interwork between ATM connections and TDM connections. The ATM matrix 204 also switches ATM connections with other ATM connections. In addition, the ATM matrix 204 can switch calls from TDM connections to other TDM connections. The ATM matrix 204 transmits and receives call signaling and user communications over the connections. The ATM matrix 204 can be identified as a communication device.

The communication device 206 is the same as the communication devices 114–118 of FIG. 1. The communication devices 114–118 and 208 can comprise additionally any connection system or part thereof, including an interworking unit or an ATM matrix.

The system of FIG. 2 operates similar to the system of FIG. 1. However, in the system of FIG. 2, the connection system 108 makes connections for TDM to ATM interworking, for ATM to ATM switching, and also for TDM to TDM switching. Therefore, the signaling processor 106 of FIG. 2 transmits control messages to the interworking unit 202 and/or to the ATM matrix 204 identifying the selected connections.

In a first example, the communication device 114 transmits call signaling to the signaling processor 106. The communication device 114 also transports user communications to the interworking unit 202.

The signaling processor 106 processes the call signaling to determine processing options for the call. The signaling processor 106 determines that the DN of the call is assigned to a portable communication device. As used herein, the term "portable communication device" means a communication device that is open to have a ported DN assigned to that communication device. A portable communication device may have one or more NPA-NXXs, and at least one NPA-NXX is open to have a ported number associated with that NPA-NXX. The signaling processor 106 queries the LNP cache 108 to determine if a match for the DN exists.

The LNP cache 108 searches the table having the LNP information and determines that a DN match exists for the DN search criteria. The DN has an associated LRN in the LNP information. The LNP cache 108 passes the LRN to the signaling processor 106.

The signaling processor 106 processes the LRN that is received from the LNP cache 108 to determine processing options for the call. The signaling processor 106 determines that the call is to be routed to the communication device 116 and selects the connections 208 and 122 to the communication device.

The signaling processor 106 creates new call signaling and transmits the new call signaling to the communication device 118 via a link. In this example, the signaling processor adds to the call signaling parameters a ported number GAP which contains the DN, places the LRN in the CdPN parameter, and sets the FCI parameter to "translated".

In addition, the signaling processor 106 transmits a control message to the interworking unit 202 identifying the selected connection 208 over which to interwork the user communications. The signaling processor 106 also transmits a control message to the ATM matrix 204 identifying the selected connection 122 over which to switch the user communications.

The interworking unit 202 receives the user communications from the communication device 114 and the control message from the signaling processor 106. In response to the control message, the interworking unit 202 interworks the user communications to the connection 208 selected by the signaling processor 106. In this example, the selected connection is VP/VC on the connection 208, and the connection over which the user communications were received is a DS0 on the connection 120.

The ATM matrix 204 receives the user communications over the connection 208 and the control message from the signaling processor 106. In response to the control message, the ATM matrix connects the user communications to the connection 122 selected by the signaling processor 106. In this example, the selected connection is a VP/VC on the connection 122. The communication device 116 receives the user communications over the connection 122 and the new call signaling transmitted from the signaling processor 106.

In a another example, the signaling processor 106 receives call signaling. The communication device 116 transports user communications to the ATM matrix 204.

The signaling processor 106 processes the call signaling to determine processing options for the call. The signaling processor 106 determines that the DN of the call is assigned to a portable communication device.

The signaling processor 106 accesses the LNP cache 108 to determine if the DN matches a DN in the LNP information. The signaling processor 106 searches the LNP information using the DN as the search criteria and determines that a match does not exist for the DN. In this example, no information is sent to the signaling processor 106 from the LNP cache 108.

The signaling processor 106 queries the LNP SCP 112 and identifies the DN. The LNP SCP 112 performs a lookup and determines that the DN is not present in its LNP information. The LNP SCP 112 responds to the signaling processor 106 with the DN.

The signaling processor 106 processes the control message that is received from the LNP SCP 112 to determine processing options for the call. The signaling processor 106 determines that the call is to be routed to the communication device 118 based on the DN of the call and selects a connection 124 to the communication device.

The signaling processor 106 updates the LNP information in the LNP cache 108 with the LNP information received from the LNP SCP 112. The signaling processor 106 creates new call signaling and transmits the new call signaling to the communication device 118 via a link. In this example, the signaling processor does not add a ported number GAP as a call signaling parameter, places the DN in the CdPN parameter, and sets the FCI parameter to "translated". The signaling processor 106 also transmits a control message to the ATM matrix 204 identifying the selected connection 124 over which to switch the user communications.

The ATM matrix 204 receives the user communications over the connection 122 and the control message from the signaling processor 106. In response to the control message, the ATM matrix connects the user communications to the connection 124 selected by the signaling processor 106. In this example, the selected connection is a VP/VC on the connection 124. The communication device 116 receives the user communications over the connection 124 and the new call signaling transmitted from the signaling processor 106.

In a further example, the signaling processor 106 receives call signaling. The communication device 114 transports user communications to the interworking unit 202.

The signaling processor 106 processes the call signaling to determine processing options for the call. The signaling processor determines that the DN of the call is assigned to a portable communication device. The signaling processor 106 queries the LNP cache 108 to determine if a match for the DN exists.

The LNP cache 108 performs a lookup in the table using the DN as the main lookup index and determines that the DN does not exist in the LNP information. The LNP cache 108 transmits a control message to the signaling processor 106 identifying the DN as not having a match.

The signaling processor 106 queries the LNP SCP 112. The LNP SCP 112 performs a lookup and determines that a match for the DN exists and that the DN has an associated LRN. The LNP SCP 112 responds to the signaling processor with the LRN.

The signaling processor 106 processes the control message that is received from the LNP SCP 112 to determine processing options for the call. The signaling processor 106 determines that the call is to be routed to the communication device 206 based on the LRN of the call and selects a connection 210 to the communication device.

The signaling processor 106 creates the new call signaling and transmits the new call signaling to the communication device 206 via a link. In this example, the signaling processor adds a ported number GAP as a call signaling parameter, places the LRN in the CdPN parameter, places the DN in the ported number GAP, and sets the FCI parameter to "translated". The signaling processor 106 also transmits a control message to the interworking unit 202 identifying the selected connection 210 over which to switch the user communications.

The interworking unit 202 receives the user communications over the connection 120 and the control message from the signaling processor 106. In response to the control message, the interworking unit 202 switches the user communications to the connection 210 selected by the signaling processor 106. In this example, the selected connection is a DS0 on the connection 210, and the user communications were received by the interworking unit 202 over a DS0 on the connection 120. The communication device 206 receives the user communications over the connection 210 and the new call signaling transmitted from the signaling processor 106.

The signaling processor 106 updates the LNP information for the DN entry in the LNP cache 108. The LNP cache 108 stores the LNP information for the DN in the table.

In another example, the communication device 116 transmits call signaling to the signaling processor 106. The communication device 114 also transports user communications to the ATM matrix 204.

The signaling processor 106 processes the call signaling to determine processing options for the call. The signaling processor 106 determines that the DN of the call is not assigned to a portable communication device.

The signaling processor 106 processes the call signaling and its associated parameters to determine processing options for the call. The signaling processor 106 determines that the call is to be routed to the communication device 114 and selects the connections 208 and 120 to the communication device.

The signaling processor 106 creates the new call signaling and transmits the new call signaling to the communication device 114 via a link. In this example, the signaling processor does not add a ported number GAP as a call signaling parameter, places the DN in the CdPN parameter, and sets the FCI parameter to "not translated".

In addition, the signaling processor 106 transmits a control message to the interworking unit 202 identifying the selected connection 120 over which to interwork the user communications. The signaling processor 106 also transmits a control message to the ATM matrix 204 identifying the selected connection 208 over which to switch the user communications.

The ATM matrix 204 receives the user communications over the connection 122 and the control message from the signaling processor 106. In response to the control message, the ATM matrix 204 connects the user communications to the connection 208 selected by the signaling processor 106. In this example, the selected connection is a VP/VC on the connection 208, and the user communication were received over a VP/VC on the connection 122.

The interworking unit 202 receives the user communications over the connection 208 and the control message from the signaling processor 106. In response to the control message, the interworking unit 202 interworks the user communications to the connection 120 selected by the signaling processor 106. In this example, the selected connection is a DS0 on the connection 120.

The communication device 116 receives the user communications over the connection 120. The communication device 114 also receives the new call signaling transmitted from the signaling processor 106.

It will be appreciated that the configurations, systems, and examples of operations of FIG. 1 are to be considered to operate fully with the configurations, systems, and examples of operations of FIG. 2. Any one or more systems, configurations, and/or examples of operations of FIG. 1 can be used in the system of FIG. 2. Moreover, any of the systems, configurations, and or examples of operations of FIGS. 1–2 can be used in any of the systems or configurations of a single apparatus or of the combined systems or configurations of FIGS. 3–41 described below.

The system of the present invention provides a memory cache, referred to herein as the N00 cache, in which N00 information is stored. N00 information is any information associated with translating a N00 or toll free call. Some examples of N00 information are dialed number, originating number, and/or routing information that are used in an N00 translation. The N00 cache allows a signaling processor to store and to quickly access the N00 information that is in the N00 cache, rather than requiring the switch or other signaling processor to query an N00 SCP for every call. The system of the present invention can access the N00 cache to determine if the N00 information it seeks is available. If the signaling processor determines that the N00 information it seeks is not accessible from the N00 cache, it then can query an N00 SCP if necessary.

It will be appreciated that the N00 cache provides a signaling processor quick access to N00 information. This allows the signaling processor to more quickly process calls and the call signaling associated with the calls and to determine routes, processing options, and connections for the calls. In addition, because fewer queries are made to the N00 SCP, cost savings are realized for the owner of the signaling processor. Moreover, link usage for access to communication devices is reduced due to the reduced query/response traffic to and from the N00 SCP.

Figure 42:
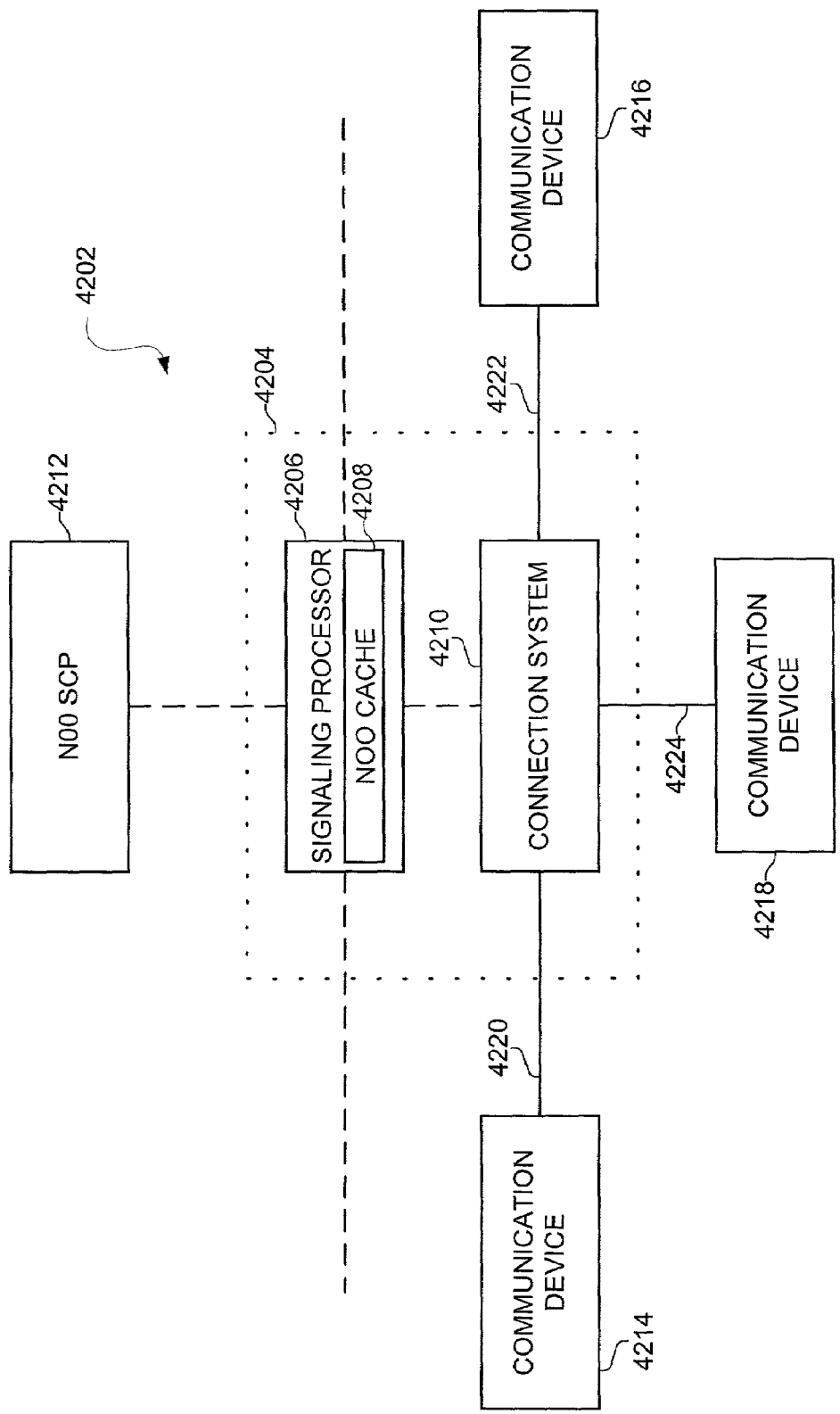
FIG. 42 is a block diagram of a caching system with a N00 cache of the present invention.

FIG. 42 illustrates an exemplary embodiment of a call connecting system of the present invention. The call connecting system 4202 comprises a call routing system 4204 having a signaling processor 4206, a N00 cache 4208, and a connection system 4210, a N00 service control point (SCP) 4212, and communication devices 4214–4218. The connection system 4210 is connected to the communication devices 4214–4218 by the connections 4220–4224, respectively.

The call routing system 4204 receives call signaling and user communications. The call routing system 4204 processes the call signaling to determine routes for the user communications and to determine new call signaling. The routing system 4204 makes connections for user communications and transmits new call signaling to the communication devices.

The signaling processor 4206 is a signaling platform that can receive, process, and generate call signaling. Based on the processed call signaling, the signaling processor 4206 selects processing options such as service or resources for the user communications and generates and transmits control messages that identify the communication device, processing option, service, and/or resource that is to be used. The signaling processor 4206 also selects other processing options, such as virtual connections and circuit-based connections for call routing, and generates and transports control messages that identify the selected connections. The signaling processor 4206 can process various forms of signaling, including ISDN, GR-303, B-ISDN, SS7, and C7. The signaling processor 4206 uses routing logic and routing tables to process the call signaling. The signaling processor 4206 can be identified as a communication device.

The signaling processor 4206 determines, based on the call signaling, whether a number is a N00 number. The signaling processor 4206 then determines whether the N00 cache should be accessed to search for the N00 information in the N00 cache 4208 and/or whether a query to the N00 SCP 4212 is necessary. The signaling processor 4206 determines whether the information received as a result of a search from the N00 cache 4208 or received in response from the N00 SCP 4212 contains a dialed number, a destination number, or other N00 information and processes the information to determine processing options and connections for calls.

The N00 cache 4208 contains N00 information in various formats to provide the N00 translation. In one embodiment, the N00 cache 4208 includes a table with dialed numbers, destination numbers that handles the N00 calls, and LRN entries.

In some embodiments, the N00 cache 4208 has similar operations to the LNP cache discussed above such as maintenance, error handling, optimization levels, out of sync handling, and accounting. However, the N00 cache 4208 includes N00 information instead of LNP information. In another embodiment, the N00 cache 4208 is combined with the LNP cache.

The N00 information can be placed in and or updated in the N00 cache 4208 on a call-by-call basis. Also, the N00 can be pre-loaded to the N00 cache 4208, loaded to the N00 cache, or updated at any time from a management system or another system.

In some embodiments, certain N00 translations are never stored in the N00 cache 4208 because the N00 SCP 4212 has to be queried based on complex N00 translation based on various factors such as time of day, date, and originating number. The N00 cache 4208 then includes a N00 flag or N00 identifier for each dialed N00 number to query the N00 SCP 4212 for N00 translations.

The N00 SCP 4212 is a database that contains N00 information. The N00 SCP 4212 responds to N00 queries made from switches or other call processor. The N00 SCP 4212 responds with N00 information. The N00 SCP 4212 can be identified as a communication device.

The communication devices 4214–4218 comprise other call routing system such as the call routing system 4204, a connection system such as the connection system 4210, customer premises equipment (CPE), a service platform, a signaling processor, a remote digital terminal, a cross connect, an interworking unit, an ATM gateway, or any other device capable of initiating, handling, or terminating a call.

The system of FIG. 42 operates as follow. In this example, N00 information entries are loaded and existent in the N00 cache either from prior queries to the N00 SCP 4212 or from being pre-loaded. The communication device 4214 transmits call signaling to the signaling processor 4206 and user communications to the connection system 4210.

The signaling processor 4206 receives the call signaling and processes the call signaling. The signaling processor 4206 determines that the called party is a N00 number.

The signaling processor 4206 queries the N00 cache 4208 to determines if the N00 number of the call is present in the N00 cache 4208. In this example, the signaling processor 4206 designates the N00 number of the call as the search criteria. The N00 cache 4208 performs the lookup into the database table using the N00 number as the main lookup index. The N00 cache 4208 determines that the N00 number is present in the N00 information and that the N00 number has an associated N00 information element, which is a destination number. The N00 cache 4208 also determines from the N00 flag or identifier that a query to the N00 SCP 4212 is not needed for this N00 number. If the N00 flag or identifier is set to launch a query to the N00 SCP 4212, the signaling processor 4206 transmits a query to the N00 SCP 4212 for the N00 information so the N00 SCP 4212 translates the N00 number based on various criteria such as time of day, date, and originating number.

The N00 cache 4208 responds to the query with the destination number. The signaling processor 4206 uses the destination number from the response to further process the call to determine one or more connections for the call. The signaling processor 4206 determines that the call is to be transmitted to the communication device 4216 and selects the connection 4222 to the communication device.

The signaling processor 4206 transmits a control message to the connection system 4210 designating the selected connection. The connection system 4210 receives the user communications and the control message and, in response to the control message, connects the user communications to the selected connection 4222.

Because the signaling processor 4206 did not have to build and transmit a query to the N00 SCP 4212, and the N00 SCP 4212 did not have to build and transmit a response to the signaling processor, significant time and processing resources are saved. In addition, neither the signaling processor 4206 nor the N00 SCP 4212 had to tear down the response or query, respectively, to process the call signaling parameters therein. This saves additional time and processing resources.

Also, because the N00 cache 4208 has memory locations within the signaling processor 4206, the signaling processor merely has to access the N00 cache, and special call signaling queries and special call signaling responses, such as those required for communication with the N00 SCP 4212, do not have to be built or processed. This results in additional saved time and processing resources.

The Controllable ATM Matrix

Figure 3:
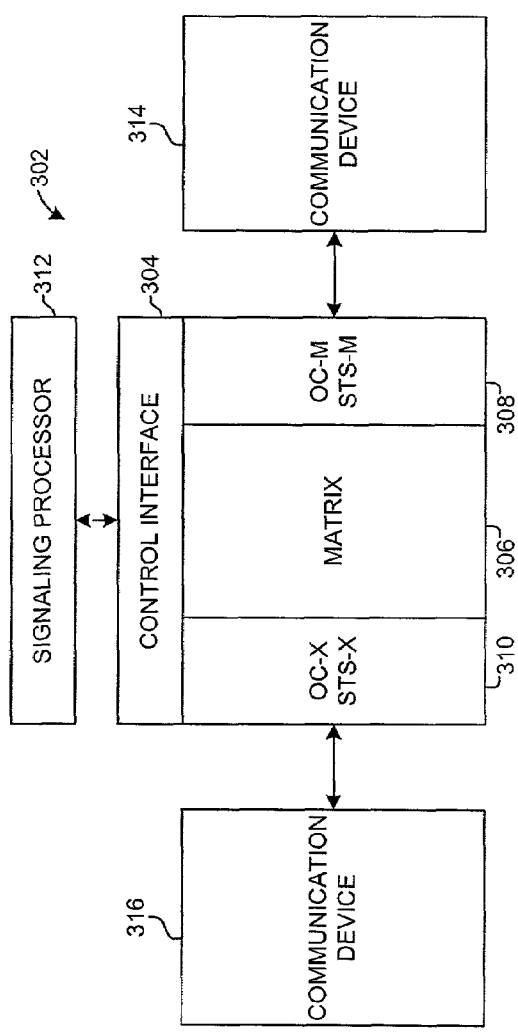
FIG. 3 is a functional diagram of a controllable asynchronous transfer mode matrix in accordance with the present invention.

FIG. 3 illustrates an exemplary embodiment of a controllable asynchronous transfer mode (ATM) matrix (CAM), but other CAMs that support the requirements of the invention also are applicable. The CAM 302 may receive and transmit ATM formatted user communications or call signaling.

The CAM 302 preferably has a control interface 304, a controllable ATM matrix 306, an optical carrier-M/synchronous transport signal-M (OC-M/STS-M) interface 308, and an OC-X/STS-X interface 310. As used herein in conjunction with OC or STS, "M" refers to an integer, and "X" refers to an integer.

The control interface 304 receives control messages originating from the signaling processor 312, identifies virtual connection assignments in the control messages, and provides these assignments to the matrix 306 for implementation. The control messages may be received over an ATM virtual connection and through either the OC-M/STS-M interface 308 or the OC-X/STS-X interface 310 through the matrix 306 to the control interface 304, through either the OC-M/STS-M interface or the OC-X/STS-X interface directly to the control interface, or through the control interface from a link.

The matrix 306 is a controllable ATM matrix that provides cross connect functionality in response to control messages from the signaling processor 312. The matrix 306 has access to virtual path/virtual channels (VP/VCs) over which it can connect calls. For example, a call can come in over a VP/VC through the OC-M/STS-M interface 308 and be connected through the matrix 306 over a VP/VC through the OC-X/STS-X interface 310 in response to a control message received by the signaling processor 312 through the control interface 304. Alternately, a call can be connected in the opposite direction. In addition, the a call can be received over a VP/VC through the OC-M/STS-M interface 308 or the OC-X/STS-X interface 310 and be connected through the matrix 306 to a different VP/VC on the same OC-M/STS-M interface or the same OC-X/STS-X interface.

The OC-M/STS-M interface 308 is operational to receive ATM cells from the matrix 306 and to transmit the ATM cells over a connection to the communication device 314.

The OC-MISTS-M interface 308 also may receive ATM cells in the OC or STS format and transmit them to the matrix 306.

The OC-X/STS-X interface 310 is operational to receive ATM cells from the matrix 306 and to transmit the ATM cells over a connection to the communication device 316. The OC-X/STS-X interface 310 also may receive ATM cells in the OC or STS format and transmit them to the matrix 306.

Call signaling may be received through and transferred from the OC-M/STS-M interface 308. Also, call signaling may be received through and transferred from the OC-X/STS-X interface 310. The call signaling may be connected on a connection or transmitted to the control interface directly or via the matrix 306.

The signaling processor 312 is configured to send control messages to the CAM 302 to implement particular features on particular VP/VC circuits. Alternatively, lookup tables may be used to implement particular features for particular VP/VCs.

Figure 4:
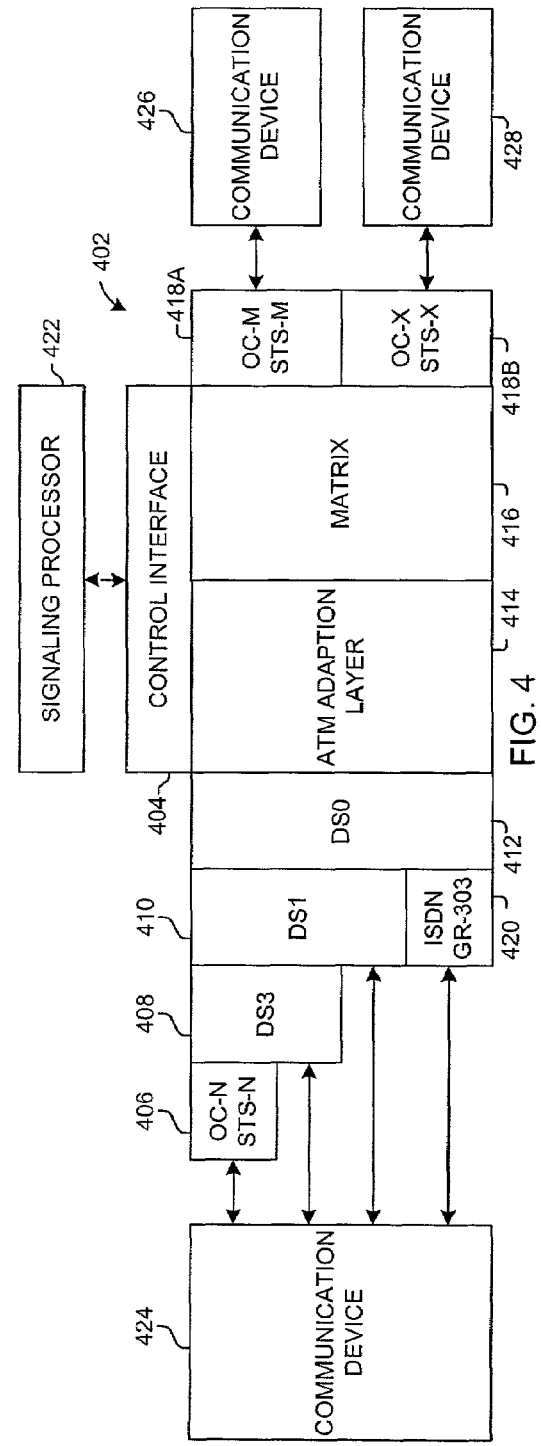
FIG. 4 is a functional diagram of a controllable asynchronous transfer mode matrix with time division multiplex capability in accordance with the present invention.

FIG. 4 illustrates another exemplary embodiment of a CAM which has time division multiplex (TDM) capability, but other CAMs that support the requirements of the invention also are applicable. The CAM 402 may receive and transmit in-band and out-of-band signaled calls.

The CAM 402 preferably has a control interface 404, an OC-N/STS-N interface 406, a digital signal level 3 (DS3) interface 408, a DS1 interface 410, a DS0 interface 412, an ATM adaptation layer (AAL) 414, a controllable ATM matrix 416, an OC-M/STS-M interface 418A, an OC-X/STS-X interface 418B, and an ISDN/GR-303 interface 420. As used herein in conjunction with OC or STS, "N" refers to an integer, "M" refers to an integer, and "X" refers to an integer.

The control interface 404 receives control messages originating from the signaling processor 422, identifies DS0 and virtual connection assignments in the control messages, and provides these assignments to the AAL 414 or the matrix 416 for implementation. The control messages may be received over an ATM virtual connection and through the OC-M/STS-M interface 418A to the control interface 404, through the OC-X/STS-X interface 418B and the matrix 416 to the control interface, or directly through the control interface from a link.

The OC-N/STS-N interface 406, the DS3 interface 408, the DS1 interface 410, the DS0 interface 412, and the ISDN/GR-303 interface 420 each can receive user communications from a communication device 424. Likewise, the OC-M/STS-M interface 418A and the OC-X/STS-X interface 418B can receive user communications from the communication devices 426 and 428.

The OC-N/STS-N interface 406 receives OC-N formatted user communications and STS-N formatted user communications and converts the user communications to the DS3 format. The DS3 interface 408 receives user communications in the DS3 format and converts the user communications to the DS1 format. The DS3 interface 408 can receive DS3s from the OC-N/STS-N interface 406 or from an external connection. The DS1 interface 410 receives the user communications in the DS1 format and converts the user communications to the DS0 format. The DS1 interface 410 receives DS1s from the DS3 interface 408 or from an external connection. The DS0 interface 412 receives user communications in the DS0 format and provides an interface to the AAL 414. The ISDN/GR-303 interface 420 receives user communications in either the ISDN format or the GR-303 format and converts the user communications to the DS0 format. In addition, each interface may transmit user communications in like manner to the communication device 424.

The OC-M/STS-M interface 418A is operational to receive ATM cells from the AAL 414 or from the matrix 416 and to transmit the ATM cells over a connection to the communication device 426. The OC-MI/STS-M interface 418A also may receive ATM cells in the OC or STS format and transmit them to the AAL 414 or to the matrix 416.

The OC-X/STS-X interface 418B is operational to receive ATM cells from the AAL 414 or from the matrix 416 and to transmit the ATM cells over a connection to the communication device 428. The OC-X/STS-X interface 418B also may receive ATM cells in the OC or STS format and transmit them to the AAL 414 or to the matrix 416.

Call signaling may be received through and transferred from the OC-N/STS-N interface 406 and the ISDN/GR-303 interface 420. Also, call signaling may be received through and transferred from the OC-M/STS-M interface 418A and the OC-X/STS-X interface 418B. The call signaling may be connected on a connection or transmitted to the control interface directly or via an interface as explained above.

The AAL 414 comprises both a convergence sublayer and a segmentation and reassembly (SAR) sublayer. The AAL 414 obtains the identity of the DS0 and the ATM VP/VC from the control interface 404. The AAL 414 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for voice calls is described in U.S. Pat. No. 5,706,553 entitled "Cell Processing for Voice Transmission," which is incorporated herein by reference.

Calls with multiple 64 Kilo-bits per second (Kbps) DS0s are known as Nx64 calls. If desired, the AAL 414 can be configured to accept control messages through the control interface 404 for Nx64 calls. The CAM 402 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 416 is a controllable ATM matrix that provides cross connect functionality in response to control messages from the signaling processor 422. The matrix 416 has access to VP/VCs over which it can connect calls. For example, a call can come in over a VP/VC through the OC-MISTS-M interface 418A and be connected through the matrix 416 over a VP/VC through the OC-X/STS-X interface 418B in response to a control message received by the signaling processor 422 through the control interface 404. Alternately, the matrix 416 may transmit a call received over a VP/VC through the OC-M/STS-M interface 418A to the AAL 414 in response to a control message received by the signaling processor 422 through the control interface 404. Communications also may occur in opposite directions through the various interfaces.

In some embodiments, it may be desirable to incorporate digital signal processing capabilities, for example, at the DS0 level. It also may be desired to apply echo control to selected DS0 circuits. In these embodiments, a signal processor may be included. The signaling processor 422 is configured to send control messages to the CAM 402 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 5 illustrates an exemplary embodiment of an interworking unit which is an ATM interworking unit 502 suitable for the present invention for use with a SONET system. Other interworking units that support the requirements of the invention also are applicable. The ATM interworking unit 502 may receive and transmit in-band and out-of-band calls.

The ATM interworking unit 502 preferably has a control interface 504, an OC-N/STS-N interface 506, a DS3 interface 508, a DS1 interface 510, a DS0 interface 512, a signal processor 514, an AAL 516, an OC-M/STS-M interface 518, and an ISDN/GR-303 interface 520. As used herein in conjunction with OC or STS, "N" refers to an integer, and "M" refers to an integer.

The control interface 504 receives control messages originating from the signaling processor 522, identifies DS0 and virtual connection assignments in the control messages, and provides these assignments to the AAL 516 for implementation. The control messages are received over an ATM virtual connection and through the OC-M/STS-M interface 518 to the control interface 504 or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518 can receive user communications from a communication device 526.

The OC-N/STS-N interface 506 receives OC-N formatted user communications and STS-N formatted user communications and demultiplexes the user communications to the DS3 format. The DS3 interface 508 receives user communications in the DS3 format and demultiplexes the user communications to the DS1 format. The DS3 interface 508 can receive DS3s from the OC-N/STS-N interface 506 or from an external connection. The DS1 interface 510 receives the user communications in the DS1 format and demultiplexes the user communications to the DS0 format. The DS1 interface 510 receives DS1s from the DS3 interface 508 or from an external connection. The DS0 interface 512 receives user communications in the DS0 format and provides an interface to the AAL 516. The ISDN/GR-303 interface 520 receives user communications in either the ISDN format or the GR-303 format and converts the user communications to the DS0 format. In addition, each interface may transmit user communications in like manner to the communication device 524.

The OC-M/STS-M interface 518 is operational to receive ATM cells from the AAL 516 and to transmit the ATM cells over the connection to the communication device 526. The OC-M/STS-M interface 518 also may receive ATM cells in the OC or STS format and transmit them to the AAL 516.

Call signaling may be received through and transferred from the OC-N/STS-N interface 506 and the ISDN/GR-303 interface 520. Also, call signaling may be received through and transferred from the OC-M/STS-M interface 518. The call signaling may be connected on a connection or transmitted to the control interface directly or via another interface as explained above.

The AAL 516 comprises both a convergence sublayer and a segmentation and reassembly (SAR) sublayer. The AAL 516 obtains the identity of the DS0 and the ATM VP/VC from the control interface 504. The AAL 516 is operational to convert between the DS0 format and the ATM format.

If desired, the AAL 516 can be configured to accept control messages through the control interface 504 for Nx64 calls. The ATM interworking unit 502 is able to interwork, multiplex, and demultiplex for multiple DS0s.

DS0 connections are bi-directional and ATM connections are typically unidirectional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 514 is included either separately (as shown) or as a part of the DS0 interface 512. The signaling processor 522 is configured to send control messages to the ATM interworking unit 502 to implement particular features on particular DS0 circuits. Alternatively, lookup tables may be used to implement particular features for particular circuits or VP/VCs.

FIG. 6 illustrates another exemplary embodiment of an interworking unit which is an ATM interworking unit 602 suitable for the present invention for use with an SDH system. The ATM interworking unit 602 preferably has a control interface 604, an STM-N electrical/optical (E/O) interface 606, an E3 interface 608, an E1 interface 610, an E0 interface 612, a signal processor 614, an AAL 616, an STM-M electrical/optical (E/O) interface 618, and a DPNSS interface 620. As used herein in conjunction with STM, "N" refers to an integer, and "M" refers to an integer.

The control interface 604 receives control messages from the signaling processor 622, identifies E0 and virtual connection assignments in the control messages, and provides these assignments to the AAL 616 for implementation. The control messages are received over an ATM virtual connection and through the STM-M interface 618 to the control interface 504 or directly through the control interface from a link.

The STM-N E/O interface 606, the E3 interface 608, the E1 interface 610, the E0 interface 612, and the DPNSS interface 620 each can receive user communications from a second communication device 624. Likewise, the STM-M E/O interface 618 can receive user communications from a third communication device 626.

The STM-N E/O interface 606 receives STM-N electrical or optical formatted user communications and converts the user communications from the STM-N electrical or STM-N optical format to the E3 format. The E3 interface 608 receives user communications in the E3 format and demultiplexes the user communications to the E1 format. The E3 interface 608 can receive E3s from the STM-N E/O interface 606 or from an external connection. The E1 interface 610 receives the user communications in the E1 format and demultiplexes the user communications to the E0 format. The E1 interface 610 receives E1s from the STM-N E/O interface 606 or the E3 interface 608 or from an external connection. The E0 interface 612 receives user communications in the E0 format and provides an interface to the AAL 616. The DPNSS interface 620 receives user communications in the DPNSS format and converts the user communications to the E0 format. In addition, each interface may transmit user communications in a like manner to the communication device 624.

The STM-M E/O interface 618 is operational to receive ATM cells from the AAL 616 and to transmit the ATM cells over the connection to the communication device 626. The STM-M E/O interface 618 may also receive ATM cells in the STM-M E/O format and transmit them to the AAL 616.

Call signaling may be received through and transferred from the STM-N E/O interface 606 and the DPNSS interface 620. Also, call signaling may be received through and transferred from the STM-M E/O interface 618. The call signaling may be connected on a connection or transmitted to the control interface directly or via another interface as explained above.

The AAL 616 comprises both a convergence sublayer and a segmentation and reassembly (SAR) sublayer. The AAL obtains the identity of the E0 and the ATM VP/VC from the control interface 604. The AAL 616 is operational to convert between the E0 format and the ATM format, either in response to a control instruction or without a control instruction. AAL's are known in the art. If desired, the AAL 616 can be configured to receive control messages through the control interface 604 for Nx64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 614 is included either separately (as shown) or as a part of the E0 interface 612. The signaling processor 622 is configured to send control messages to the ATM interworking unit 602 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," filed on Feb. 20, 1998, which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 7:
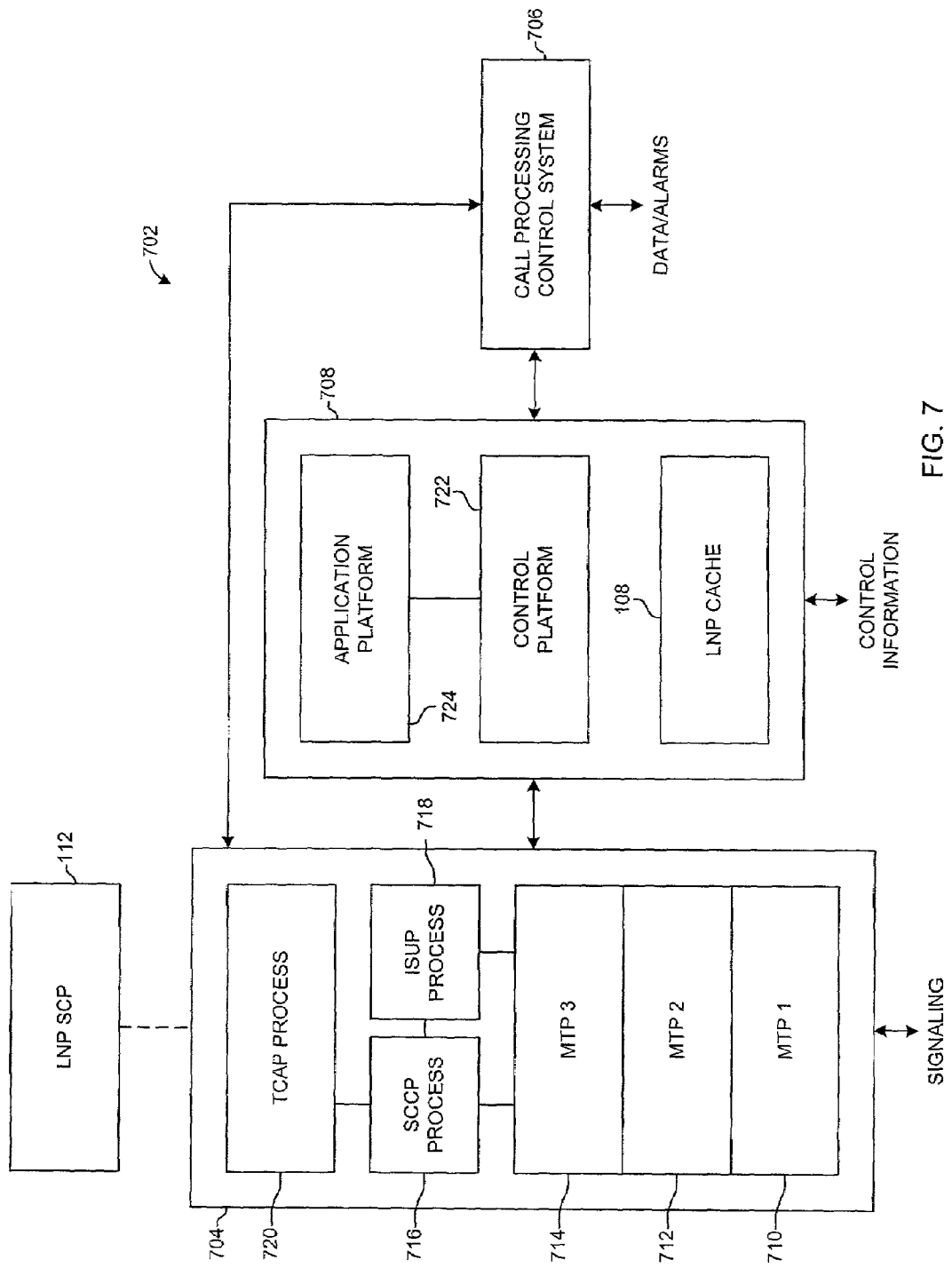
FIG. 7 is a block diagram of a signaling processor constructed in accordance with the present system.

FIG. 7 depicts an embodiment of a signaling processor. Other versions also are contemplated. In the embodiment of FIG. 7, the signaling processor 702 has a signaling interface 704, a call processing control system 706 (CPCS), and a call processor 708. It will be appreciated that the signaling processor 702 may be constructed as modules in a single unit or as multiple units.

The signaling interface 704 is coupled externally to signaling systems preferably to signaling systems having a message transfer part (MTP), an ISDN user part (ISUP), a signaling connection control part (SCCP), an intelligent network application part (INAP), and a transaction capabilities application part (TCAP). The signaling interface 704 preferably is a platform that comprises an MTP level 1 710, an MTP level 2 712, an MTP level 3 714, an SCCP process 716, an ISUP process 718, and a TCAP process 720. The signaling interface 704 also has INAP functionality.

The signaling interface 704 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 704 is operational to transmit, process, and receive call signaling. The TCAP, SCCP, ISUP, and INAP functionality use the services of the MTP to transmit and receive the messages. Preferably, the signaling interface 704 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 704 process information that is received in message signal units (MSUs) and convert the information to call information elements that are sent to the call processor 708 to be processed. A call information element may be, for example, an ISUP IAM message parameter from the MSU. The signaling interface 704 strips the unneeded header information from the MSU to isolate the message information parameters and passes the parameters to the call processor 708 as the call information elements. Examples of these parameters are the called number, the calling number, and user service information. Other examples of messages with information elements are an ANM, an ACM, an REL, an RLC, and an INF. In addition, call information elements are transferred from the call processor 708 back to the signaling interface 704, and the information elements are reassembled into MSUs and transferred to a signaling point.

The CPCS 706 is a management and administration system. The CPCS 706 is the user interface and external systems interface into the call processor 708. The CPCS 706 serves as a collection point for call-associated data such as logs, operational measurement data, statistical information, accounting information, and other call data. The CPCS 706 can configure the call-associated data and/or transmit it to reporting centers.

The CPCS 706 accepts data, such as the translations, from a source such as an operations system and updates the data in the tables in the call processor 708. The CPCS 706 ensures that this data is in the correct format prior to transferring the data to the call processor 708. The CPCS 706 also provides configuration data to other devices including the call processor 708, the signaling interface 704, the interworking unit (not shown), and the controllable ATM matrix (not shown). In addition, the CPCS 706 provides for remote control of call monitoring and call tapping applications from the call processor 708.

The CPCS 706 also serves as a collection point for alarms. Alarm information is transferred to the CPCS 706. The CPCS 706 then transports alarm messages to the required communication device. For example, the CPCS 706 can transport alarms to an operations center.

The CPCS 706 also has a human-machine interface (HMI). This allows a person to log onto the CPCS 706 and manage data tables or review data tables in the CPCS or provide maintenance services.

The call processor 708 processes call signaling and controls an ATM interworking unit, such as an ATM interworking multiplexer (mux) that performs interworking of DS0s and VP/VCs, and an ATM matrix. However, the call processor 708 may control other communications devices and connections in other embodiments.

The call processor 708 comprises a control platform 722 and an application platform 724. Each platform 722 and 724 is coupled to the other platform.

The control platform 722 is comprised of various external interfaces including an interworking unit interface, a controllable ATM matrix, an echo interface, a resource control interface, a call information interface, and an operations interface. The control platform 722 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 706. Typical call information includes accounting information, such as the parties to the call, time points for the call, and any special features applied to the call. One skilled in the art will appreciate how to produce the software for the interfaces in the control platform 722.

The application platform 724 processes signaling information from the signaling interface 704 to select connections. The identity of the selected connections are provided to the control platform 722 for the interworking unit interface and/or for the controllable ATM matrix interface. The application platform 724 is responsible for validation, translation, routing, call control, exceptions, screening, and error handling. In addition to providing the control requirements for the interworking unit and the controllable ATM matrix, the application platform 724 also provides requirements for echo control and resource control to the appropriate interface of the control platform 722. In addition, the application platform 724 generates signaling information for transmission by the signaling interface 704. The signaling information might be for ISUP, INAP, or TCAP messages to external network elements. Pertinent information for each call is stored in an enhanced circuit data block (ECDB) for the call. The ECDB can be used for tracking and accounting the call.

The application platform 724 preferably operates in general accord with the Basic Call State Model (BCSM) defined by the ITU. An instance of the BCSM is created to handle each call. The BCSM includes an originating process and a terminating process. The application platform 724 includes a service switching function (SSF) that is used to invoke the service control function (SCF). Typically, the SCF is contained in an SCP. The SCF is queried with TCAP or INAP messages that are transported by the signaling interface 704 and which are initiated with information from the SSF in the application platform 724. The originating or terminating processes will access remote databases with intelligent network (IN) functionality via the SSF.

Software requirements for the application platform 724 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 708 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 7, it can be seen that the application platform 724 processes signaling information to control numerous systems and facilitate call connections and services. The SS7 signaling is exchanged between the call processor 708 and external components through the signaling interface 704, and control information is exchanged with external systems through the control platform 722. Advantageously, the signaling interface 704, the CPCS 706, and the call processor 708 are not integrated into a switch central processing unit (CPU) that is coupled to a switching matrix. Unlike an SCP, the components of the signaling processor 702 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
MNR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 8:
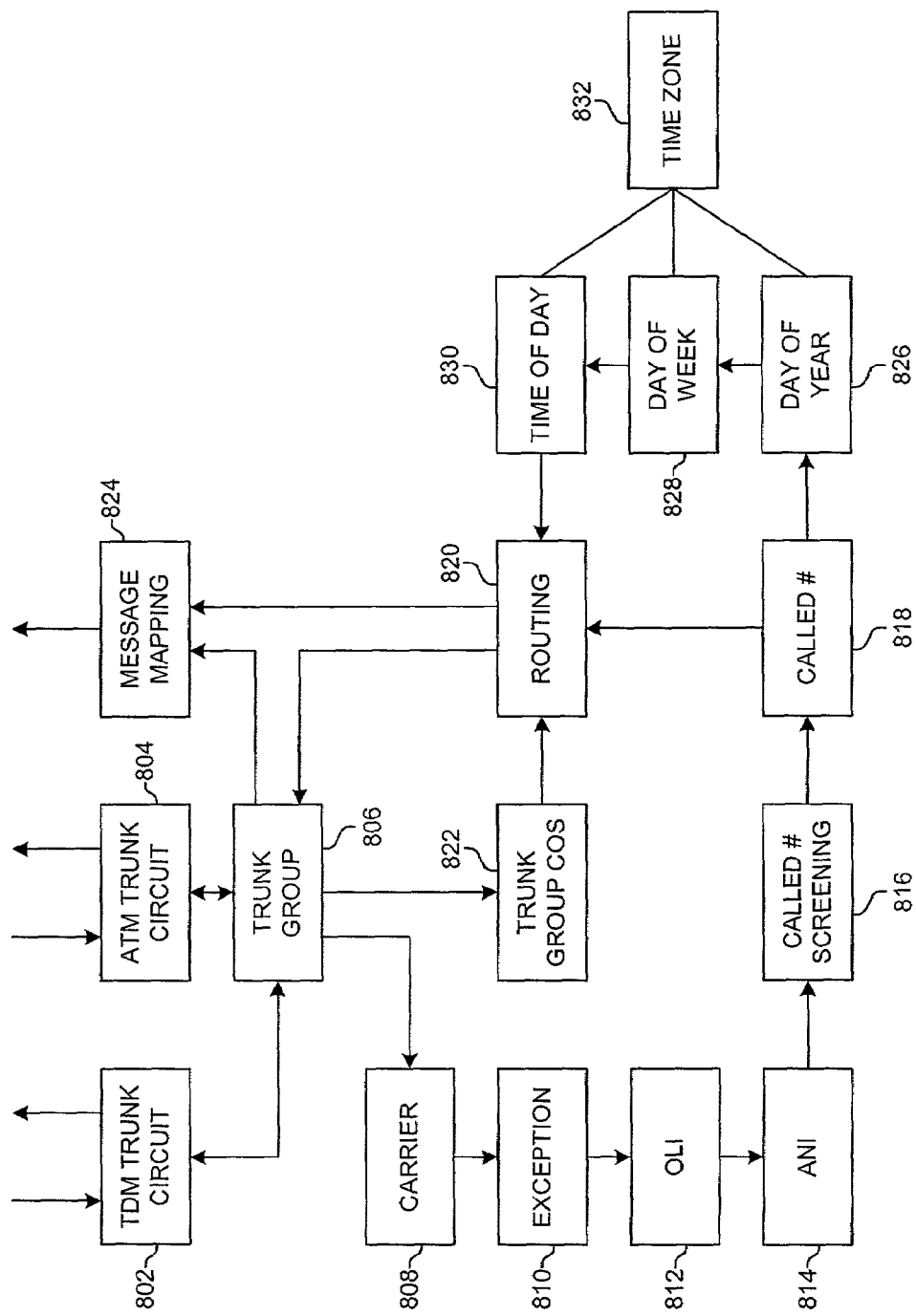
FIG. 8 is a block diagram of a data structure having tables that are used in the signaling processor of FIG. 7.

FIG. 8 depicts an exemplary data structure preferably used by the call processor 702 of FIG. 7 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 8.

The primary data structure has a TDM trunk circuit table 802, an ATM trunk circuit table 804, a trunk group table 806, a carrier table 808, an exception table 810, an originating line information (OLI) table 812, an automatic number identification (ANI) table 814, a called number screening table 816, a called number table 818, a routing table 820, a trunk group class of service (COS) table 822, and a message mapping table 824. Also included in the data structure are a day of year table 826, a day of week table 828, a time of day table 830, and a time zone table 832.

The TDM trunk circuit table 802 contains information required to provision the TDM side of a connection from the call processor site. Each circuit on the TDM side of a connection has an entry. The TDM trunk circuit table 802 is accessed from the trunk group table 806 or an external call process, and it points to the trunk group table.

The ATM trunk circuit table 804 contains information required to provision the ATM side of a connection. Typically, one record appears in this table per ATM trunk group. Although, the system can be configured alternately for multiple records per trunk group. The ATM trunk circuit table 804 is accessed from the trunk group table 806 or an external call process, and it points to the trunk group table.

The trunk group table 806 contains information that is required to build trunk groups out of different trunk members identified in the TDM and ATM trunk circuit tables 802 and 804. The trunk group table 806 contains information related to the originating and terminating trunk groups. The trunk group table 806 typically points to the carrier table 808. Although, the trunk group table 806 may point to the exception table 810, the OLI table 812, the ANI table 814, the called number screening table 816, the called number table 818, the routing table 820, the day of year table 826, the day of week table 828, the time of day table 830, and the treatment table (see FIG. 9).

For default processing of an IAM of an outgoing call in the forward direction, when the call process determines call setup and routing parameters for user communications on the originating portion, the trunk group table 806 is the next table after the TDM and ATM trunk circuit tables 802 and 804, and the trunk group table points to the carrier table 808. For default processing of an IAM of an outgoing call in the forward direction, when the call process determines call setup and routing parameters for user communications on the terminating portion, the trunk group table 806 is the next table after the routing table 820, and the trunk group table points to the TDM or ATM trunk circuit table 802 or 804. For default processing of an ACM or an ANM of an outgoing call in the originating direction, when the call process determines parameters for signaling, the trunk group table 806 is the next table after the TDM or ATM trunk circuit table 802 or 804, and the trunk group table points to the message mapping table 824. It will be appreciated that this is the default method, and, as explained herein, other implementations of table processing occur.

The carrier table 808 contains information that allows calls to be screened based, at least in part, on the carrier information parameter and the carrier selection parameter. The carrier table 808 typically points to the exception table 810. Although, the carrier table 808 may point to the OLI table 812, the ANI table 814, the called number screening table 816, the called number table 818, the routing table 820, the day of year table 826, the day of week table 828, the time of day table 830, the treatment table (see FIG. 9), and the database services table (see FIG. 11).

The exception table 810 is used to identify various exception conditions related to the call that may influence the routing or handling of the call. The exception table 810 contains information that allows calls to be screened based, at least in part, on the called party number and the calling party's category. The exception table 810 typically points to the OLI table 812. Although, the exception table 810 can point to the ANI table 814, the called number screening table 816, the called number table 818, the routing table 820, the day of year table 826, the day of week table 828, the time of day table 830, the call rate table, the percent control table, the treatment table (see FIG. 9), and the database services table (see FIG. 11).

The OLI table 812 contains information that allows calls to be screened based, at least in part, on originating line information in an IAM. The OLI table 812 typically points to the ANI table 814. Although, the OLI table can point to the called number screening table 816, the called number table 818, the routing table 820, the day of year table 826, the day of week table 828, the time of day table 830, and the treatment table (see FIG. 9).

The ANI table 814 is used to identify any special characteristics related to the caller's number, which is commonly known as automatic number identification. The ANI table 814 is used to screen and validate an incoming ANI. ANI specific requirements such as queuing, echo cancellation, time zone, and treatments can be established. The ANI table 814 typically points to the called number screening table 816. Although, the ANI table 814 can point to the called number table 818, the routing table 820, the day of year table 826, the day of week table 828, the time of day table 830, and the treatment table (see FIG. 9).

The called number screening table 816 is used to screen called numbers. The called number screening table 816 determines the disposition of the called number and the nature of the called number. The called number screening table 816 is used to provide the trigger detection point (TDP) for an AIN SCP TCAP query. It is used, for example, with the local number portability (LNP) feature. The called number screening table can invoke a TCAP. The called number screening table 816 typically points to the called number table 818. Although, the called number screening table 816 can point to the routing table 820, the treatment table, the call rate table, the percent table (see FIG. 9), and the database services table (see FIG. 11).

The called number table 818 is used to identify routing requirements based on, for example, the called number. This will be the case for standard calls. The called number table 818 typically points to the routing table 810. In addition, the called number table 826 can be configured to alternately point to the day of year table 826. The called number table 818 can also point to the treatment table (see FIG. 9) and the database services table (see FIG. 11).

The routing table 820 contains information relating to the routing of a call for various connections. The routing table 820 typically points to the treatment table (see FIG. 9). Although, the routing table also can point to the trunk group table 806 and the database services table (see FIG. 11).

For default processing of an IAM of an outgoing call in the forward direction, when the call process determines call setup and routing parameters for user communications, the routing table 820 is the next table after the called number table 818, and the routing table points to the trunk group table 806. For default processing of an IAM of an outgoing call in the forward direction, when the call process determines parameters for signaling, the routing table 820 is the next table after the called number table 818, and the routing table points to the message mapping table 824. It will be appreciated that this is the default method, and, as explained herein, other implementations of table processing occur.

The trunk group COS table 822 contains information that allows calls to be routed differently based on the class of service assigned to the originating trunk group and to the terminating trunk group. The trunk group COS table can point to the routing table 820 or the treatment table (see FIG. 9).

When the trunk group COS table 822 is used in processing, after the routing table 820 and the trunk group table 806 are processed, the trunk group table points to the trunk group COS table. The trunk group COS table points back to the routing table 820 for further processing. Processing then continues with the routing table 820 which points to the trunk group table 806, and the trunk group table which points to the TDM or ATM trunk circuit table 802 or 804. It will be appreciated that this is the default method, and, as explained herein, other implementations of table processing occur.

The message mapping table 824 is used to provide instructions for the formatting of signaling messages from the call processor. It typically can be accessed by the routing table 820 or the trunk group table 806 and typically determines the format of the outgoing messages leaving the call processor.

The day of year table 826 contains information that allows calls to be routed differently based on the day of the year. The day of year table typically points to the routing table 820 and references the time zone table 832 for information. The day of year table 826 also can point to the called number screening table 816, the called number table 818, the routing table 820, the day of week table 828, the time of day table 830, and the treatment table (see FIG. 9).

The day of week table 828 contains information that allows calls to be routed differently based on the day of the week. The day of week table typically points to the routing table 820 and references the time zone table 832 for information. The day of week table 828 also can point to the called number screening table 816, the called number table 818, the time of day table 830, and the treatment table (see FIG. 9).

The time of day table 830 contains information that allows calls to be routed differently based on the time of the day. The time of day table 830 typically points to the routing table 820 and references the time zone table 832 for information. The time of day table 830 also can point to the called number screening table 816, the called number table 818, and the treatment table (see FIG. 9).

The time zone table 832 contains information that allows call processing to determine if the time associated with the call processing should be offset based on the time zone or daylight savings time. The time zone table 832 is referenced by, and provides information to, the day of year table 826, the day of week table 828, and the time of day table 830.

Figure 9:
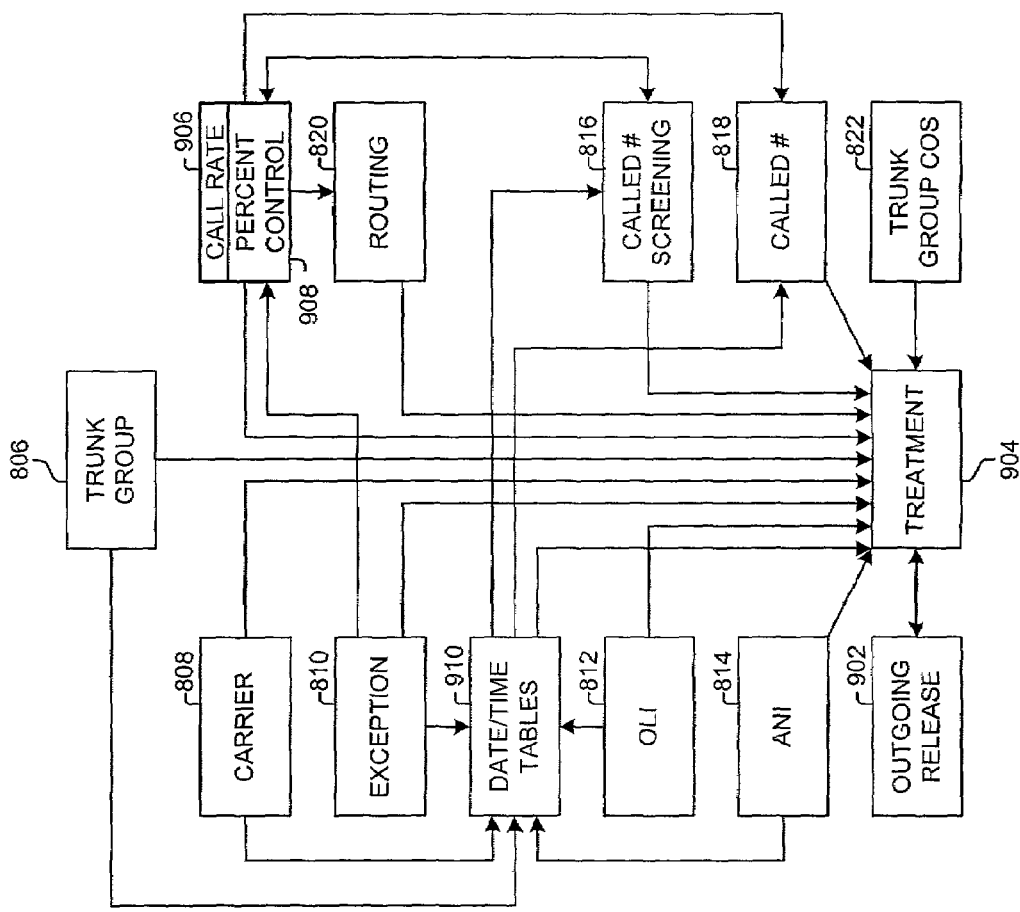
FIG. 9 is a block diagram of additional tables that are used in the signaling processor of FIG. 8.

FIG. 9 is an overlay of FIG. 8. The tables from FIG. 8 are present. However, for clarity, the table's pointers have been omitted, and some tables have not been duplicated in FIG. 9. FIG. 9 illustrates additional tables that can be accessed from the tables of FIG. 8. These include an outgoing release table 902, a treatment table 904, a call rate table 906, and a percent control table 908, and time/date tables 910.

The outgoing release table 902 contains information that allows call processing to determine how an outgoing release message is to be formatted. The outgoing release table 902 typically points to the treatment table 906.

The treatment table 904 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 904 typically points to the outgoing release table 902 and the database services table (see FIG. 10).

The call rate table 906 contains information that is used to control call attempts on an attempt per second basis. Preferably, attempts from 100 per second to 1 per minute are programmable. The call rate table 906 typically points to the called number screening table 816, the called number table 818, the routing table 820, and the treatment table 904.

The percent control table 908 contains information that is used to control call attempts based upon a percent value of the traffic that is processed through call processing. The percent control table 908 typically points to the called number screening table 816, the called number table 818, the routing table 820, and the treatment table 904.

The date/time tables 910 have been identified in FIG. 8 as the day of year table 826, the day of week table 828, the time of day table 826, and the time zone table 832. They are illustrated in FIG. 9 as a single location for ease and clarity but need not be so located.

Figure 10:
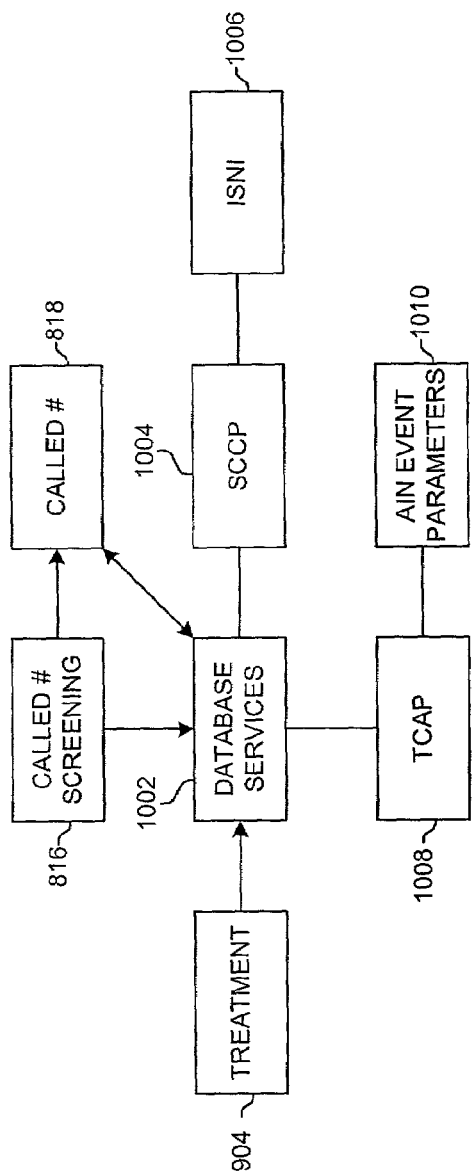
FIG. 10 is a block diagram of additional tables that are used in the signaling processor of FIG. 8.

FIG. 10 is an overlay of FIGS. 8–9. The tables from FIGS. 8–9 are present. However, for clarity, the table's pointers have been omitted, and some tables have not been duplicated in FIG. 10.

FIG. 10 illustrates additional tables that can be accessed from the tables of FIGS. 8–9 and which are directed to the TCAP and the SCCP message processes. These include a database services table 1002, a signaling connection control part (SCCP) table 1004, an intermediate signaling network identification (ISNI) table 1006, a transaction capabilities application part (TCAP) table 1008, and an advanced intelligent network (AIN) event parameters table 1010.

The database services table 1002 contains information about the type of database service requested by call processing. The database services table 1002 references and obtains information from the SCCP table 1004 and the TCAP table 1008. After the database function is performed, the call is returned to normal call processing. The database services table 1002 points to the called number table 818.

The SCCP table 1004 contains information and parameters required to build an SCCP message. The SCCP table 1004 is referenced by the database services table 1002 and provides information to the database services table.

The ISNI table 1006 contains network information that is used for routing SCCP message to a destination node. The ISNI table 1006 is referenced by the SCCP table 1004 and provides information to the SCCP table.

The TCAP table 1008 contains information and parameters required to build a TCAP message. The TCAP table 1008 is referenced by the database services table 1002 and provides information to the database services table.

The AIN event parameters table 1010 contains information and parameters that are included in the parameters portion of a TCAP event message. The AIN event parameters table 1010 is referenced by the TCAP table 1008 and provides information to the TCAP table.

Figure 11:
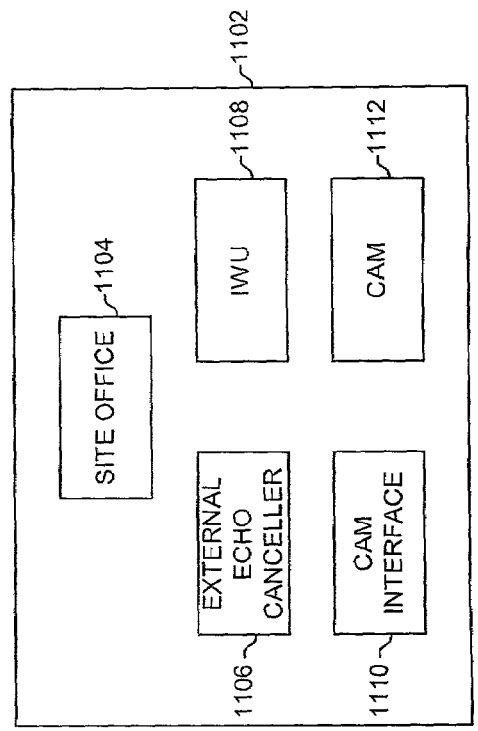
FIG. 11 is a block diagram of additional tables that are used in the signaling processor of FIG. 8.

FIG. 11 is an overlay of FIGS. 8–10. The tables from FIGS. 8–10 are present. However, for clarity, the tables have not been duplicated in FIG. 11. FIG. 11 illustrates additional tables that can be used to setup the call process so that the tables of FIGS. 8–10 may be used. These setup tables 1102 include a site office table 1104, an external echo canceller table 1106, an interworking unit (IWU) table 1108, a controllable ATM matrix (CAM) interface table 1110, and a controllable ATM matrix (CAM) table 1112.

The site office table 1104 contains information which lists office-wide parameters, some of which are information-based and others which affect call processing. The site office table 1104 provides information to the call processor or switch during initialization or other setup procedures, such as population of data or transfer of information to one or more memory locations for use during call processing.

The external echo canceller 1106 contains information that provides the interface identifier and the echo canceller type when an external echo canceller is required. The external echo canceller table 1106 provides information to the call processor or switch during initialization or other setup procedures, such as population of data or transfer of information to one or more memory locations for use during call processing.

The IWU table 1108 contains the internet protocol (IP) identification numbers for interfaces to the interworking units at the call processor or switch site. The IWU table 1108 provides information to the call processor or switch during initialization or other setup procedures, such as population of data or transfer of information to one or more memory locations for use during call processing.

The CAM interface table 1110 contains information for the logical interfaces associated with the CAM. The CAM interface table 1110 provides information to the call processor or switch during initialization or other setup procedures, such as population of data or transfer of information to one or more memory locations for use during call processing.

The CAM table 1112 contains information associated with the logical and physical setup properties of the CAM. The CAM table 1112 provides information to the call processor or switch during initialization or other setup procedures, such as population of data or transfer of information to one or more memory locations for use during call processing.

FIGS. 12–41 depict examples of the various tables described above. It will be appreciated that other versions of tables may be used. In addition, information from the identified tables may be combined or changed to form different tables.

FIG. 12 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 13 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 14A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is received, an outgoing JIP has the same value as the received JIP. If an ISUP JIP is not received in an IAM, and a default JIP value is present, then call processing will populate the JIP of the outgoing JAM with the default value from the trunk group table. If a JP is not received, and there is no default JIP value, then an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 14B is a continuation of FIG. 14A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 14C is a continuation of FIG. 14B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 15 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 16 depicts an example of an exception table. The exception label is used as a key to enter the table. The calling party's category entry specifies how to process a call from an ordinary subscriber, an unknown subscriber, or a test phone. The called number nature of address differentiates between 0+calls, 1+calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 17 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 18 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 806.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 19 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 20 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 21 depicts an example of a day of year table. The day of year label is used as a key to enter the table. The date field indicates the local date which is applicable to the action to be taken during the processing of this table. The next function and next label identify the table and the area within that table for further call processing.

FIG. 22 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 23 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 24 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 25 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 26 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 27 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 28 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 29 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 30 depicts an example of a call rate table. The call rate label is used as a key to enter the table. The call rate specifies the number of calls that will be passed by the control for on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 31 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 32A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 32B is a continuation of FIG. 32A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 32C is a continuation of FIG. 32B for the SCCP table. FIG. 32C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 32D is a continuation of FIG. 32C for the SCCP table. FIG. 32D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 33 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 34 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 35 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 36 depicts an example of an interworking unit interface table. The interworking unit (IWU) is a key that is used to enter the table. The fWU identification (ID) identifies which interworking unit is being addressed. The internet protocol (IP) sockets 1–4 specify the IP socket address of any of the four connections to the interworking unit.

FIG. 37 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 38 depicts an example of a controllable ATM matrix (CAM) table. The CAM label is used as a key to enter the table. The CAM type indicates the type of CAM control protocol. The CAM address identifies the address of the CAM.

FIG. 39A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 39B is a continuation of FIG. 39A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 39C is a continuation of FIG. 39B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 39D is a continuation of FIG. 39C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 40A–40B depict an example of an advanced intelligent network (AIN) event parameters table. The AIN event parameters table has two columns. The first identifies the parameters that will be included in the parameters portion of the TCAP event message. The second entry may include information for analysis.

FIG. 41 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Operation

It will be appreciated that the LNP cache 108 can be located in the signaling interface 704, the CPCS 706, or the call processor 708. Preferably, the LNP cache 108 is located in the call processor 708.

When the LNP cache 108 is located in the call processor 708, a considerable savings in processing time and processing resources is saved because the call processor does not need to transmit a control message to the LNP cache. Instead, when the LNP cache 108 is located with the call processor 708, the call processor can access the LNP cache as needed as quickly as it accesses any other memory location. Therefore, control messages and call signaling queries are not required to but built, transmitted, or passed through the MTP levels 1 and 2. In addition, control messages and call signaling for responses will not have to be received and processed for removal of header information and passage through the MTP levels 1 and 2.

In addition, the maintenance, performance, and accounting systems described above can be co-located with the LNP cache, such as in the call processor 708. Alternately, the maintenance, performance, and accounting systems of the LNP cache 108 can be located in the CPCS 706.

The operation of the LNP cache 108 in the system of FIGS. 7–41 is the same as the description of the operation of the LNP cache in the system of FIGS. 1 and 2. However, in addition to the operation of FIGS. 1 and 2, the signaling interface 704, the CPCS 706, and the call processor 708 will perform the functions described above.

In addition, the call signaling with its associated parameters and the LNP information with its associated elements are processed with routing logic and routing tables in the call processor 708 as described above. The call processor 708 can be configured to access the LNP cache 108 while processing the call signaling and the LNP parameters with the routing tables of FIGS. 8–41. That is, the routing logic processes the call signaling parameters, the routing tables process the call signaling parameters and trigger access to the LNP cache 108 if needed. The routing tables further process any LNP information and call signaling parameter to determine new call signaling parameters and route selection information. The new call signaling parameters and the route selection information is processed by the routing logic before new call signaling is created and transmitted and before control messages are transmitted.

For example, the routing tables can process the call signaling parameters and the LNP parameters, and the access to the LNP cache 108 can be triggered from the routing tables, such as the called number screening table 816 or the called number table 818. Preferably, the access to the LNP cache is triggered from the called number screening table 816.

In the event that the LNP cache 108 is triggered by the routing tables of the call processor 708 and a match is not found for the DN, then a query is triggered by the routing tables, out the signaling interface 704, and to the LNP SCP 112. The response is received by the signaling interface 704, and the call signaling parameters and the LNP information elements are transmitted to the call processor 708 for processing by the routing tables.

The query to the LNP SCP 112 can be triggered from the routing tables, such as the called number screening table 816, the called number table 818, or the exception table 810. Preferably, the called number screening table 816 triggers the query. The routing tables further processes any LNP information and call signaling parameters to determine new call signaling parameters and route selection information. The new call signaling parameters and the route selection information is processed by the routing logic before new call signaling is created and transmitted and before control messages are transmitted.

Also, the call processor 708 can be configured to access the LNP cache 108 to obtain the LNP information, if existent, prior to processing the call signaling and the LNP parameters with the routing tables of FIGS. 8–41. That is, the routing logic processes the call signaling parameters, accesses the LNP cache 108 if needed, further processes any LNP information and call signaling parameters, and then processes the call signaling and the LNP information with the routing tables of FIGS. 8–41. The new call signaling parameters and the route selection information is again processed by the routing logic before new call signaling is created and transmitted and before control messages are transmitted.

In the event that the LNP cache 108 is accessed by the routing logic of the call processor 708 and a match is not found for the DN, then a query is initiated by the routing logic, out the signaling interface 704, and to the LNP SCP 112. The response is received by the signaling interface 704, and the call signaling parameters and the LNP information elements are transmitted to the call processor 708 for processing by the routing logic. The routing logic further processes any LNP information and call signaling parameters, and then the call signaling parameters and the LNP information are processed with the routing tables. The new call signaling parameters and the route selection information is again processed by the routing logic before new call signaling is created and transmitted and before control messages are transmitted. Other methods may be used.

Those skilled in the art will appreciate that variations from the specific embodiments disclosed above are contemplated by the invention. The invention should not be restricted to the above embodiments, but should be measured by the following claims.

What is claimed is:

1. A system for connecting a call having call signaling and user communications, the system comprising:
a signaling processor configured to receive the call signaling, to process the call signaling to determine if a search is required and to determine if a search criteria matches an N00 information element, to select the search criteria for the search, to select a connection for the user communications, and to transmit a control message identifying the selected connection;

a N00 cache having N00 information comprising an entry with a N00 number and a corresponding entry with a destination number and configured to be searched using the search criteria to determine if the N00 information element exists in the N00 information, the search having a result; and a connection system adapted to receive the user communications and the control message and in response to the control message, to connect the user communications over the designated connection.

2. The system of claim 1 wherein the N00 cache is configured to have a flag for the N00 number that identifies whether a query to a N00 service control point for N00 information is required.

3. The system of claim 2 wherein the signaling processor is configured to process the flag for the N00 number and to generate and transmit the query to the N00 service control point based on the flag.

4. The system of claim 1 wherein the signaling processor is configured to process the call signaling and the result to select the connection.

5. The system of claim 1 further comprising:

a N00 service control point having other N00 information and configured to receive a query from the signaling processor, to process the query to determine if the N00 information element exists in the other N00 information, and to transmit a response containing a query result.

6. The system of claim 5 wherein:

the response comprises update N00 information;

the signaling processor is further configured to receive the response and to provide the update N00 information to the N00 cache; and the N00 cache is further configured to update the N00 information with the update N00 information.

* * * * *